US012754369B2

(12) United States Patent
Mathai

(10) Patent No.: US 12,754,369 B2
(45) Date of Patent: Oct. 6, 2026

(54) SILICON-ON-INSULATOR PHOTONIC INTEGRATED CIRCUITS WITH INTEGRATED SILICON PHOTONIC COMPONENT AND SILICON/NITROGEN PHOTONIC COMPONENT

(71) Applicant: HEWLETT PACKARD ENTERPRISE DEVELOPMENT LP, Spring, TX (US)

(72) Inventor: Sagi Varghese Mathai, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 337 days.

(21) Appl. No.: 18/627,078

(22) Filed: Apr. 4, 2024

(65) Prior Publication Data

US 2025/0314820 A1 Oct. 9, 2025

(51) Int. Cl.
*G02B 6/122* (2006.01)
*G02B 6/12* (2006.01)
*G02B 6/134* (2006.01)

(52) U.S. Cl.
CPC ....... *G02B 6/1228* (2013.01); *G02B 6/12004* (2013.01); *G02B 6/1347* (2013.01); *G02B 2006/121* (2013.01)

(58) Field of Classification Search
CPC ................ G02B 6/1228; G02B 6/1347; G02B 2006/121
See application file for complete search history.

(56) References Cited

U.S. PATENT DOCUMENTS 9,257,814 B1 * 2/2016 Djordjevic .............. H01S 5/142
2025/0125577 A1 * 4/2025 Mathai .................. H01S 3/1613

OTHER PUBLICATIONS

Choi et al., "Study of phosphorus-doped Si annealed by a multi-wavelength laser", Results in Physics, 2022, 9 pages.
Liu et al., "A photonic integrated circuit based erbium-doped amplifier", Apr. 2022, 25 pages.

* cited by examiner

*Primary Examiner* — Sung H Pak
(74) *Attorney, Agent, or Firm* — Jones Burke, PLLC

(57) ABSTRACT

A photonic integrated circuit may comprise a silicon substrate, a buried oxide (BOX) layer disposed on the silicon substrate, a silicon device layer disposed on the BOX layer, a first silicon waveguide in the silicon device layer, and a silicon/nitrogen waveguide optical amplifier disposed on the BOX layer. The first silicon waveguide comprises a first silicon waveguide core formed in the silicon device layer. The silicon/nitrogen waveguide optical amplifier comprises a first silicon/nitrogen waveguide core portion disposed on the BOX layer and optically coupled with the first silicon waveguide core. The first silicon/nitrogen waveguide core portion comprises a compound of silicon and nitrogen.

20 Claims, 14 Drawing Sheets

15

15

115

115

215

315

315

315

SILICON-ON-INSULATOR PHOTONIC INTEGRATED CIRCUITS WITH INTEGRATED SILICON PHOTONIC COMPONENT AND SILICON/NITROGEN PHOTONIC COMPONENT

INTRODUCTION

In photonic communications, information is encoded in light signals and transmitted through photonic interconnects, such as optical fibers. The light signals may also be processed (generated, conveyed, detected, amplified, converted, etc.) by various photonic components, such as waveguides, lasers, photodiodes, amplifiers, couplers, etc. One type of optical component is an optical amplifier, which receives and amplifies a light signal. The optical amplifier has a gain medium which can be "pumped" to raise electrons to excited states, and then when the signal light passes through this gain medium it interacts with the excited electrons, causing them to fall back to a lower energy state and emit a photon (light) through the phenomenon of stimulated emission. The emitted photon has the same wavelength and travels in the same direction as the signal light which stimulated its emission, and therefore each emitted photon is added to and becomes part of the stream of photons making up the light signal, thereby amplifying the signal.

To reduce the size and cost of a photonic circuit, and to increase its efficiency, the photonic components making up the photonic circuit may be integrated together in a photonic integrated circuit (PIC), in an analogous fashion to how electronic components may be integrated together into an electronic integrated circuit. A PIC is a microchip comprising two or more photonic components integrated together on the same substrate.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
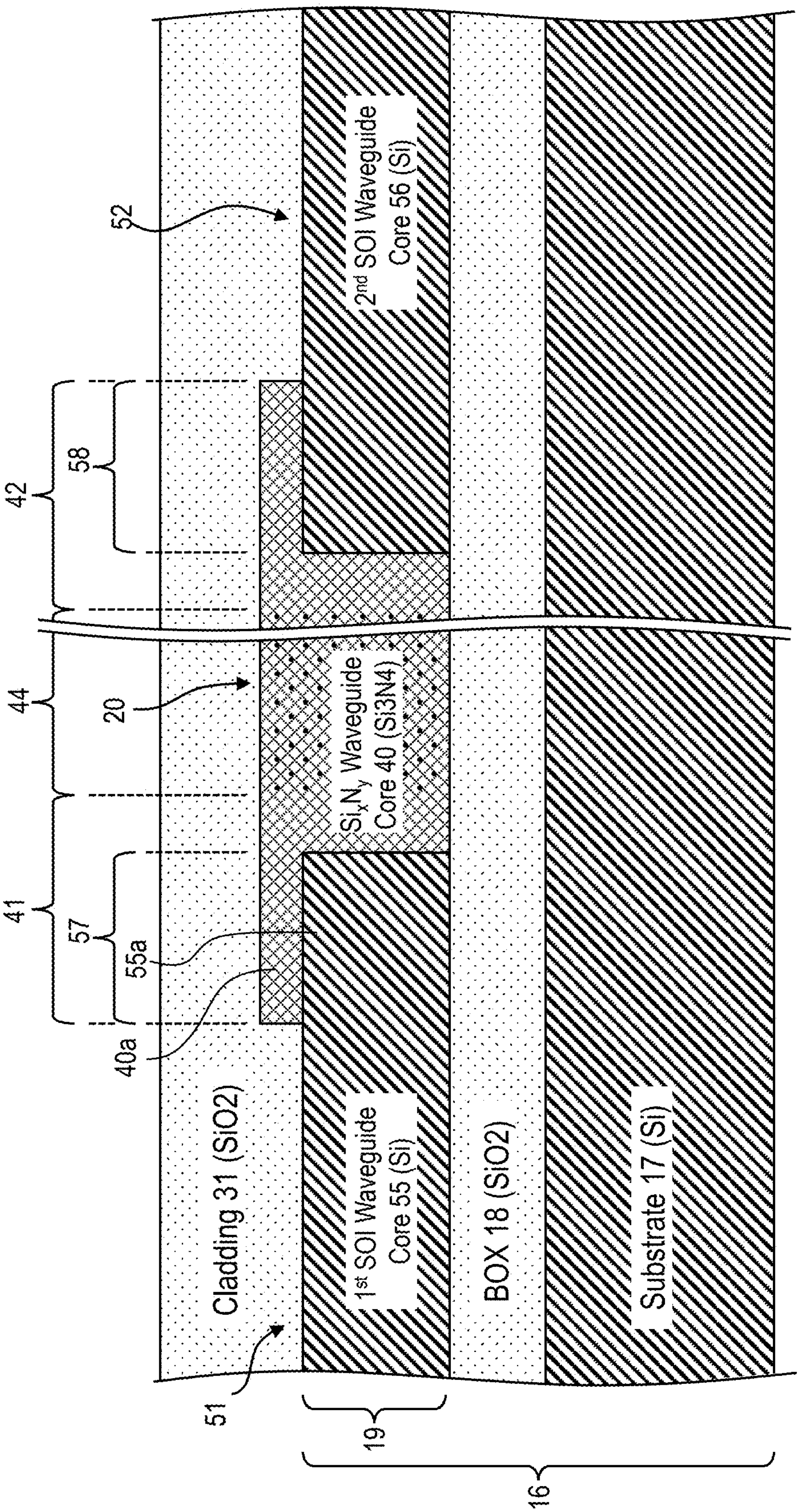
FIG. 1 is a schematic cross-section of an example photonic integrated circuit, with the section taken along 1-1 in FIG. 2.

Some photonic components can be formed in silicon. In some circumstances, it may be desired to integrate such silicon-based photonic components together into a photonic integrated circuit (PIC). One approach to this is to form the silicon components in a silicon layer of the same silicon-on-insulator (SOI) wafer. The resulting PIC which comprises these silicon photonic components may be referred to herein as an SOI PIC.

While it may be relatively easy to integrate some silicon components together into a PIC, it can be challenging to integrate an optical amplifier into the same PIC with silicon components. Generally, the optical amplifier is not made from silicon like the silicon photonic components of the SOI wafer because silicon is an indirect bandgap semiconductor and thus is generally not suitable for use as a gain medium for optical amplification. Accordingly, optical amplifiers are usually formed from other materials, such III-V semiconductors. III-V semiconductor waveguide amplifiers can be integrated with silicon photonic components, but doing so can be complex and costly. For example, III-V semiconductors can be used to form optical amplifiers in a III-V based wafer which is separate from the SOI wafer which has the silicon components, and then the III-V wafer is combined with the SOI wafer via flip-chip bonding or similar techniques. But this approach can be costly and difficult because SOI wafers are generally processed using complementary metal-oxide-semiconductor (CMOS) processing techniques and III-V materials are generally not CMOS compatible. Thus, special treatment may be needed in order to prevent contamination of the underlying silicon optical components of the SOI wafer and the CMOS manufacturing line itself when attempting to bond the III-V wafer with the SOI wafer. This makes the fabrication process more difficult and more costly.

To address these and other issues, disclosed herein are photonic integrated circuits (PICs) which integrate together silicon components with a silicon/nitrogen based photonic component, such as a silicon-nitride waveguide optical amplifier. The silicon/nitrogen based optical component is formed from a compound having both silicon and nitrogen, such as silicon-nitride ($Si3N4$), silicon rich nitride, or silicon oxynitride ($Si(x)O(y)N(z)$). The silicon/nitrogen optical components can be processed using CMOS techniques, and therefore the special treatments which would be needed if III-V semiconductors were used are not needed when forming the silicon/nitrogen photonic components. Thus, the SOI PICs disclosed herein which integrate silicon/nitrogen photonic components and the silicon photonic components may be relatively less difficult and less costly to produce than PICs which integrate III-V photonic components with silicon photonic components.

In some examples, a SOI PIC comprises a silicon waveguide and a silicon/nitrogen waveguide. These waveguides are optically coupled together such that light traversing the silicon waveguide enters and traverses the silicon/nitrogen waveguide, or vice versa. For example, the ending portion of the silicon waveguide may be disposed adjacent to and overlap with a starting portion of the silicon/nitrogen waveguide such that, as light traversing the silicon waveguide reaches the end thereof, it is coupled over into the beginning of the silicon/nitrogen waveguide, or vice versa. The overlapping between the silicon and silicon/nitrogen waveguides may include horizontal overlapping, vertical overlapping, or both. Vertical refers to a direction along which layers of the PIC are stacked, which is generally perpendicular to a face of the wafer. Horizontal refers to directions which are perpendicular to vertical and thus parallel to the layers (parallel to the face of the wafer). In some examples, the overlapping portions of the waveguides are tapered in opposite directions from one another and form an adiabatic transition between the two waveguides.

In some examples, the silicon and silicon/nitrogen waveguides may be connected to (or form respective parts of) other photonic components, with the silicon waveguide and the silicon/nitrogen waveguide serving as an interface for passing light between those components. For example, the silicon waveguide may be connected to an SOI optical modulator, while the silicon/nitrogen waveguide may be connected to (or form part of) a silicon-nitride waveguide optical amplifier. In some examples in which the SOI PIC comprises a silicon-nitride waveguide optical amplifier, the amplifier may comprise at least two silicon-nitride waveguide portions: an undoped waveguide core portion and a doped waveguide core portion, which has been doped with one or more rare-earth elements, such as Praseodymium (Pr), Erbium (Er), Ytterbium (Yb), Bismuth (Bi), Neodymium (Nd), etc. The undoped waveguide core portion forms the aforementioned silicon/nitrogen waveguide and may be optically coupled to the silicon waveguide at one end and to the doped waveguide core portion at the other end. The undoped waveguide core portion may also be optically coupled to a pump waveguide, which supplies pump light to the amplifier. The doped waveguide core portion forms the gain medium of the amplifier. Thus, in such examples, light signals can be passed from an upstream silicon optical component (e.g., SOI optical modulator) to the gain medium of the amplifier via the interface comprising the silicon waveguide and the undoped silicon-nitride waveguide portion. In this manner, optical amplifiers can be integrated into an SOI PIC without the need to use III-V semiconductors or other complicated and costly techniques.

These and other aspects of various examples will be described in greater detail below with reference to the figures.

Figure 2:
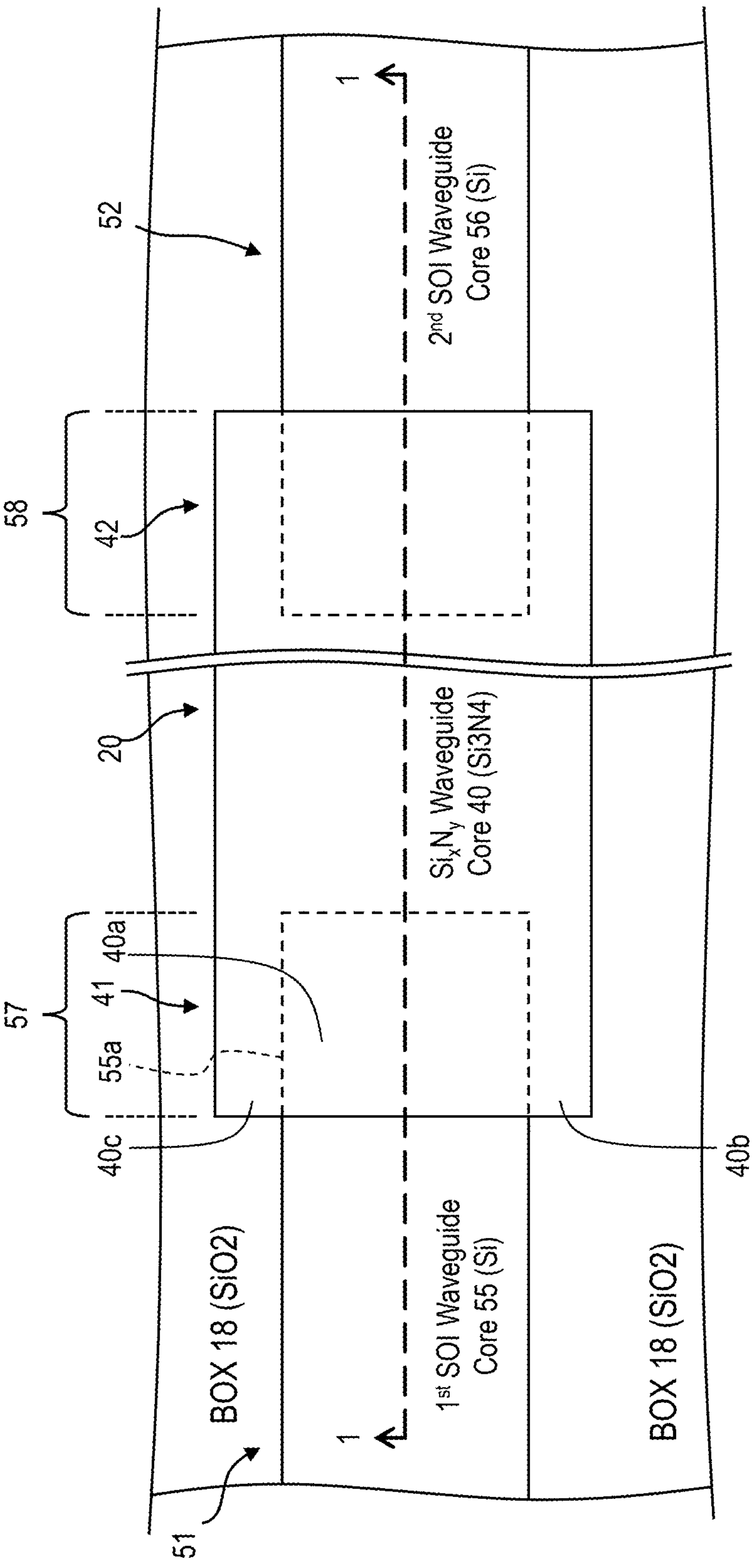
FIG. 2 is a schematic plan view of the photonic integrated circuit of FIG. 1.

FIGS. 1 and 2 illustrate an example SOI PIC 15. FIGS. 1 and 2 are schematic in nature and are not intended to show specific shapes or dimensions. FIGS. 1 and 2 are also not intended to exhaustively show all of the features of the SOI PIC 15, and the SOI PIC 15 may include more or fewer of the illustrated components and/or additional components which are not illustrated. FIG. 2 shows the SOI PIC 15 from a top-down perspective, with cladding 31 made transparent to reveal the underlying layers. FIG. 1 shows the SOI PIC 15 in cross-section, with the section taken along line 1-1 in FIG. 2.

The SOI PIC 15 comprises at least one silicon photonic component and at least one silicon/nitrogen photonic component integrated together on the same silicon substrate 17. References to a first item being disposed "on" a second item should be understood as meaning the two items are part of the same photonic integrated circuit comprising stacked layers and that the first item is positioned vertically above the second item or component in the layer stacking direction; this may include but is not limited to a configuration in which the first item is touching the second item (e.g., there may be one or more intervening items between the first and second items). As used herein, "silicon/nitrogen" refers to a material which is a compound of at least silicon and nitrogen, such as silicon nitride (Si3N4), silicon rich nitride, silicon oxynitride, etc. "Silicon/nitrogen" may be abbreviated as $Si_xN_y$ herein and in the figures.

In some examples, the silicon photonic component comprises at least one SOI waveguide 51 (also referred to as "silicon waveguide 51), and the silicon/nitrogen photonic component comprises at least one silicon/nitrogen waveguide 41, which is optically coupled with the SOI waveguide 51. In some examples, the SOI PIC 15 may also comprise additional silicon photonic components, such as a second SOI waveguide 52 and one or more other silicon photonic components (not illustrated), such as an optical modulator. In some examples, the silicon/nitrogen waveguide 41 is part of a larger silicon/nitrogen waveguide amplifier 20, which may comprise other waveguide portions including a doped waveguide portion 44 which forms the gain medium of the amplifier; in such examples, the silicon/nitrogen waveguide 41 may be an undoped waveguide portion 41 of the amplifier, and the amplifier may further comprise a second undoped waveguide portion 42. These and other components will be described in greater detail in turn below.

As shown in FIG. 1, the SOI PIC 15 is formed from an SOI wafer 16 comprising a silicon substrate 17 (also referred to as the "handle"), a buried oxide (BOX) layer 18 disposed on the silicon substrate layer 17, and a silicon device layer 19 disposed on the BOX layer 18. The silicon substrate 17 and the silicon device layer 19 may be formed from silicon, while the BOX layer 18 may be formed from an oxide such as silicon dioxide ($SiO_2$), for example. One of ordinary skill in the art would understand how to form an SOI wafer such as SOI wafer 16, and thus detailed description thereof is omitted. In addition, SOI wafers are commercially available, and in some examples a standard commercially available SOI wafer may be used as the SOI wafer 16.

The SOI wafer 16 may be processed (e.g., etched, etc.) to form various silicon photonic components in the silicon device layer 19. As shown in FIGS. 1 and 2, these SOI components include at least the first SOI waveguide 51, which was mentioned above. This waveguide 51 comprises a silicon waveguide core 55 (also referred as SOI waveguide core 55), together with cladding abutting one or more sides of the waveguide core 55. The cladding comprises portions of the BOX layer 18 and/or a cladding layer 31, which are adjacent to one or more sides of the waveguide core 55 (in some examples, the cladding surrounds the core 55). The cladding layer 31 is a layer which is deposited on and adjacent to the silicon device layer 19 subsequent to forming the silicon core 55. The silicon waveguide core 55 may be optically coupled to another silicon component (not illustrated), such as an optical modulator. In some examples, the silicon waveguide 51 may be a strip or rib waveguide.

In FIGS. 1 and 2, the cladding (i.e., BOX 18 and cladding 31) is shown as surrounding four sides of the waveguide core 55, but this is merely an illustrative example and one of ordinary skill in the art would understand that the cladding of a waveguide (such as waveguide 51) can be arranged in a variety of different arrangements relative to the waveguide core. In some examples, the BOX layer 18 and the cladding 31 are both formed from a compound of silicon and oxygen, such as silicon dioxide (SiO2). In other examples, other materials may be used as the BOX and/or cladding layers 18 and 31, as would be familiar to those of ordinary skill in the art. The silicon waveguide 51 may be formed in the silicon device layer 19 by removing portions of the silicon (e.g., by etching) such that the portions which remain have the desired shape for the waveguide core 55, and then depositing cladding 31 on and around the waveguide core 55 as desired (depending on the type of waveguide being formed). One of ordinary skill in the art would understand how to form a silicon waveguide, such as silicon waveguide 51, in the silicon device layer of an SOI wafer, and thus detailed description thereof is omitted herein.

In addition, the SOI PIC 15 also includes at least a first silicon/nitrogen waveguide 41, which is optically coupled with the first SOI waveguide 51. The first silicon/nitrogen waveguide 41 is formed from a silicon/nitrogen waveguide core 40, together with cladding abutting one or more sides of the waveguide core 40. The cladding comprises portions of the BOX layer 18 and/or the cladding layer 31, which are adjacent to one or more sides of the waveguide core 40 (in some examples, the cladding surrounds the core 40). The silicon/nitrogen ($Si_xN_y$) waveguide core 40 is formed from a compound comprising both silicon and nitrogen, such as stoichiometric silicon nitride (Si3N4), silicon rich nitride, or silicon oxynitride (Si(x)O(y)N(z)). In some examples, the BOX layer 18 and cladding 31 are formed from a compound of silicon and oxygen, such as silicon dioxide ($SiO_2$), or silicon oxynitride (a compound of silicon, oxygen and nitrogen) (Si(x)O(y)N(z)). In other examples, other materials may be used as the cladding layers, as would be familiar to those of ordinary skill in the art.

As noted above, the first silicon/nitrogen waveguide 41 is optically coupled with the first SOI waveguide 51. This optical coupling is achieved by positioning the silicon/nitrogen waveguide core 40 such that a portion thereof is adjacent to and overlaps a portion of the first SOI waveguide core 55, with the overlap forming a transition region 57 in which light traversing one of the cores 40 or 55 is coupled over to the other. In some examples, the silicon/nitrogen waveguide core 40 overlaps the first SOI waveguide core 55 vertically, meaning that one or more portions of the core 40 is positioned above or below the waveguide core 55 in the layer-stacking direction. In some examples, the silicon/nitrogen waveguide core 40 overlaps the first SOI waveguide core 55 horizontally, meaning that one or more portion of the core 40 are positioned alongside the waveguide core 55 in the same vertical layer. In some examples, the silicon/nitrogen waveguide core 40 overlaps the first SOI waveguide core 55 both vertically and horizontally.

For instance, FIGS. 1 and 2 illustrate one example of how the silicon/nitrogen waveguide core 40 could overlap the first SOI waveguide core 55 both vertically and horizontally, with a portion 40*a* of core 40 being positioned above an overlapped portion 55*a* of the waveguide core 55, another portion 40*b* of the core 40 being positioned in the same layer as and adjacent one lateral side of the overlapped portion 55*a* of core 55, and yet another portion 40*c* being positioned in the same layer as and along another lateral side of the overlapped portion 55*a* of core 55. In this way, three sides of the core 55 are overlapped by the core 40 in both horizontal and vertical directions. In other words, in this example, the core 40 partially envelops or surrounds three sides the core 55. FIGS. 1 and 2 are schematic in nature, and thus are not intended to depict specific shapes or dimensions of the cores 40 or 55 of the overlapping portions thereof. In some examples, the overlapping portions of the cores 40 and 55 may have tapered and/or pointed shapes, as will be described in greater detail below with reference to FIG. 3. In other examples, the overlapping portions of the cores 40 and 55 may have other shapes (not illustrated), such as the shape of a rectangular prism or any other desired shape. In some examples, the overlapping portions of the cores 40 and 55 may be entirely lateral or vertical.

In FIG. 1, the core 40 is in contact with the core 55, but in other examples, the core 40 could be spaced apart from the waveguide core 55 by some distance. Generally, the cores 55 and 40 may be positioned close together to enable optical coupling therebetween, but the maximum separation distance between core 40 and core 55 that will allow for optical coupling may vary depending on the wavelength of light and the dimensions, shapes, and materials of the cores 40 and 55. A person of ordinary skill in the art would understand how to arrange the cores 40 and 55 relative to one another in the transition region 57 so as to enable optical coupling therebetween based on the specific details of a given implementation.

As noted above, in some examples, the first silicon/nitrogen waveguide 41 is one part of a larger silicon/nitrogen waveguide optical amplifier 20, as illustrated in FIGS. 1 and 2. This is merely one example, and in other examples the first silicon/nitrogen waveguide 41 could be part of, or could be coupled to, some other optical component. In examples in which the silicon/nitrogen waveguide optical amplifier 20 is present, the silicon/nitrogen waveguide optical amplifier 20 may comprise multiple waveguide portions, some of which may be doped and some of which may be undoped. For example, in some implementations, the first silicon/nitrogen waveguide 41 may be a first undoped waveguide portion 41 of the amplifier 20, and the amplifier 20 may further comprise a doped waveguide portion 44 and a second undoped waveguide portion 42.

In some examples, first undoped waveguide portion 41, doped waveguide portion 44, and second undoped waveguide portion 42 are all formed from the same silicon/nitrogen waveguide core 40, which has been doped in regions corresponding to the doped waveguide portion 44 but not in regions corresponding to the undoped waveguide portions 41 and 42. Specifically, doped waveguide portion 44 comprises a portion of silicon/nitrogen waveguide core 40 which has been doped with one or more rare-earth elements, such as Praseodymium (Pr), Erbium (Er), Ytterbium (Yb), Bismuth (Bi), Neodymium (Nd), etc., whereas undoped waveguide portions 41 and 42 comprise portions of the silicon/nitrogen waveguide core 40 which have not been doped. The undoped waveguide portions 41 and 42 may be undoped, in some examples, to avoid optical losses which might occur in the transition regions 57 and 58 if the waveguide portions 41 and 42 were doped. In addition, by not doping these waveguide portions 41 and 42, the need to pump these regions is avoided, thus reducing complexity.

In other examples (not illustrated), first undoped waveguide portion 41, doped waveguide portion 44, and second undoped waveguide portion 42 are formed from physically distinct silicon/nitrogen cores which are optically coupled together. In such examples, the respective cores forming undoped waveguide portions 41 and 42 may comprise an undoped silicon/nitrogen material, whereas the core forming doped waveguide portion 44 comprises a silicon/nitrogen material which has been doped with a rare-earth element.

In some examples, the SOI PIC 15 further comprises a second SOI waveguide core 56. The second SOI waveguide core 56 may be similar to the first SOI waveguide core 56 but is optically coupled to the other end of the silicon/nitrogen waveguide optical amplifier 20. Specifically, in the example illustrated in FIGS. 1 and 2, the second SOI waveguide core 56 is optically coupled to the second undoped waveguide portion 42 via second transition region 58, which is similar to transition region 57. The second SOI waveguide core 56 may also be optically coupled to additional silicon photonic components (not illustrated). In other examples, second SOI waveguide core 56 is omitted. Second SOI waveguide core 56 may be included in some examples in which there are integrated silicon components downstream of the amplifier 20, whereas second SOI waveguide core 56 may be omitted in some examples in which there are no integrated silicon components downstream of the amplifier 20.

The amplifier 20 may have a variety of configurations, including any of the configurations of the amplifiers disclosed in U.S. patent application Ser. No. 18/488,308, titled "OPTICAL WAVEGUIDE AMPLIFIERS WITH DOPED SILICON-BASED CORE" and filed 17 Oct. 2023, the entire contents of which is incorporated herein by reference. For example, in some implementations, doped waveguide portion 44 of the amplifier 20 may have configurations similar to any one of the doped waveguide cores 40, 140, 240-1 or 240-2, 340-1 or 340-2, 440-1 or 440-2, 540-1 or 540-2, 640, 740, 840, 940, 1040, 1140, 1240, 1340-1 or 1340-2, 1440-1 or 1440-2, 1540-1 or 1540-2, 1640, 1740-1 or 1740-2, 1881, 1882, 1981, 1982, 2081, 2082, 2181, and 2281 disclosed in U.S. Ser. No. 18/488,308. In some examples, undoped waveguide portions 41 and/or 42 may each form one half of a wavelength division multiplexing (WDM) coupler, which is configured to couple pump laser light received from a pump light source over into the doped waveguide portion 44, similar to the WDM couplers described in U.S. Ser. No. 18/488,308. The other half of the WDM couplers may be formed by another undoped waveguide portion (not illustrated in FIGS. 1 and 2; but see pump waveguide 161 in FIG. 5 as one example), which is optically coupled with the undoped waveguide portions 41 and/or 42 and which receives the pump laser light signal. For example, undoped waveguide portions 41 and/or 42 may have configurations similar to those of the undoped core portions 745, 846, 945*a*, 947*a*, 1045*a*, 1047*a*, 1145*a*, 1147*a*, 1245*a*, 1247*a*, 1345*a*, 1347*a*, 1445*a*, 1447*a*, 1545*a*, 1547*a*, 1645, 1647, 1745*a*, 1747*a*, 2145, and 2246 in U.S. Ser. No. 18/488,308. Although not illustrated, SOI PIC 15 may also comprise other silicon or silicon/nitrogen components, including any of the other components illustrated in U.S. Ser. No. 18/488,308 such as a polarization splitter/rotator or polarization rotator/combiner, isolators, lasers, etc. These components may be formed using the silicon and/or silicon/nitrogen layers. Moreover, SOI PIC 15 may include multiple instances of silicon/nitrogen waveguide optical amplifiers 20, which may be arranged as part of the same integrated circuit (on the same substrate) according to any of the arrangements disclosed in U.S. Ser. No. 18/488,308, such as an arrangement in which multiple amplifiers 20 are disposed in a one or two-dimensional array (see, e.g., FIGS. 18 and 20 of U.S. Ser. No. 18/488,308) or an arrangement in which multiple amplifiers 20 are interleaved (see, e.g., FIGS. 8-10 of U.S. Ser. No. 18/488,308).

The manner of forming the silicon/nitrogen waveguide core 40 (or the respective silicon/nitrogen cores of the waveguide portions 41, 42, and 44 in those examples in which they have physically separate cores) may vary from one implementation to the next depending on factors such as the type of overlap between the silicon/nitrogen waveguide core 40 and the silicon waveguide core 55 (e.g., horizontal only, vertical only, or both horizontal and vertical) and the types of silicon photonic component which are to be included in the silicon device layer 19.

In some examples, the silicon/nitrogen waveguide core 40 may be formed by deposition on the SOI wafer 16 after the waveguide core 55 (and other silicon components, if others are present) has been formed in the silicon device layer 19. In examples in which the silicon/nitrogen waveguide core 40 overlaps the silicon waveguide core 55 both horizontally and vertically (such as is illustrated in FIGS. 1 and 2), the waveguide core 40 may be formed by: (1) removing a portion of the silicon device layer 19 (e.g., by etching) in a pattern corresponding to the desired path of the waveguide core 40; (2) depositing a silicon/nitrogen compound (e.g., silicon nitride) on the silicon device layer 19 and in the regions of the removed silicon; (3) removing portions of the deposited silicon/nitrogen compound which were deposited on the silicon device layer 19 to achieve the desired pattern for the waveguide core 40 (while leaving intact at least the portion 40*a* which vertically overlaps the core 55); (4) doping regions of the waveguide core 40 corresponding to the doped portion 44; and (5) depositing the cladding 31 on the silicon device layer 19 and on the core 40. In those implementations in which the waveguide core 40 overlaps the waveguide core 55 only horizontally, the same steps as described above may be used except that no silicon/nitrogen compound is retained above the core 55 (i.e., either none is deposited there in the second step, or if deposited is removed in the third step). In those implementations in which the core 40 only vertically overlaps the core 55, the silicon/nitrogen compound may be deposited directly on top of the silicon device layer 19 or on/in a layer which is vertically above the silicon device layer 19 (e.g., on or in the cladding layer 31). The aforementioned fabrication steps are given for illustrative purposes only. One with skill in the art may devise other fabrication steps to achieve the same goal.

In those examples in which the core 40 is formed by deposition on the SOI wafer 16, single or multiple layers of the silicon/nitrogen compound may be deposited during the second step using plasma enhanced chemical vapor deposition (PECVD), inductively coupled plasma chemical vapor deposition (ICP-CVD), low pressure chemical vapor deposition (LPCVD), atomic layer deposition (ALD), sputtering, or other deposition techniques. The choice of deposition method, fabrication steps and sequence will depend on the desired implementation, particularly on the allowable thermal budget for the SOI components. The implanted silicon/nitrogen regions may be annealed in a furnace or rapid thermal annealer (RTA) at temperatures greater than 1000 C to drive out residual optical loss inducing impurities such as hydrogen, heal implantation damage, and activate or move the rare earth ions to a more favorable location in the host material. Passive SOI components, such as silicon waveguide core 55, may be able to tolerate this annealing, but active SOI components may not. Therefore, the waveguide core 40 may need to be formed prior to any fabrication steps with limited thermal budget (e.g. ultra-shallow junctions in silicon, pn junctions, metal contacts, etc.). An alternative to the full wafer in a furnace or RTA is local laser annealing, in which a laser is directed to the core 40 to anneal the silicon/nitrogen compound thereof while avoiding other regions which may potentially be heat sensitive. This may allow more flexibility in the fabrication sequence.

In other examples, Al2O3 may be employed instead of silicon/nitrogen materials to serve as the host material for the rare earth ions. Al2O3 doped with a rare earth ion may be formed by ion implantation, co-sputtering Al and a rare earth ion in an oxygen environment, atomic layer deposition, etc.

In other examples, the silicon/nitrogen waveguide core 40 may be formed in a wafer which is separate from the SOI wafer 16, and then these separately formed wafers (or portions thereof) may be bonded together via known techniques such as room temperature wafer bonding, chiplet bonding, or layer bonding. This approach can allow for the separate optimization of the silicon components and the silicon/nitrogen compounds on their respective wafers prior to bonding and without the concern about damaging the active silicon components during annealing of the silicon/nitrogen compounds. However, this approach may be better suited to examples in which only vertical overlap between the core 40 and the core 55 is desired, as attaining horizontal overlap between the cores 40 and 55 may be difficult using separate wafer formation followed by bonding.

Figure 3:
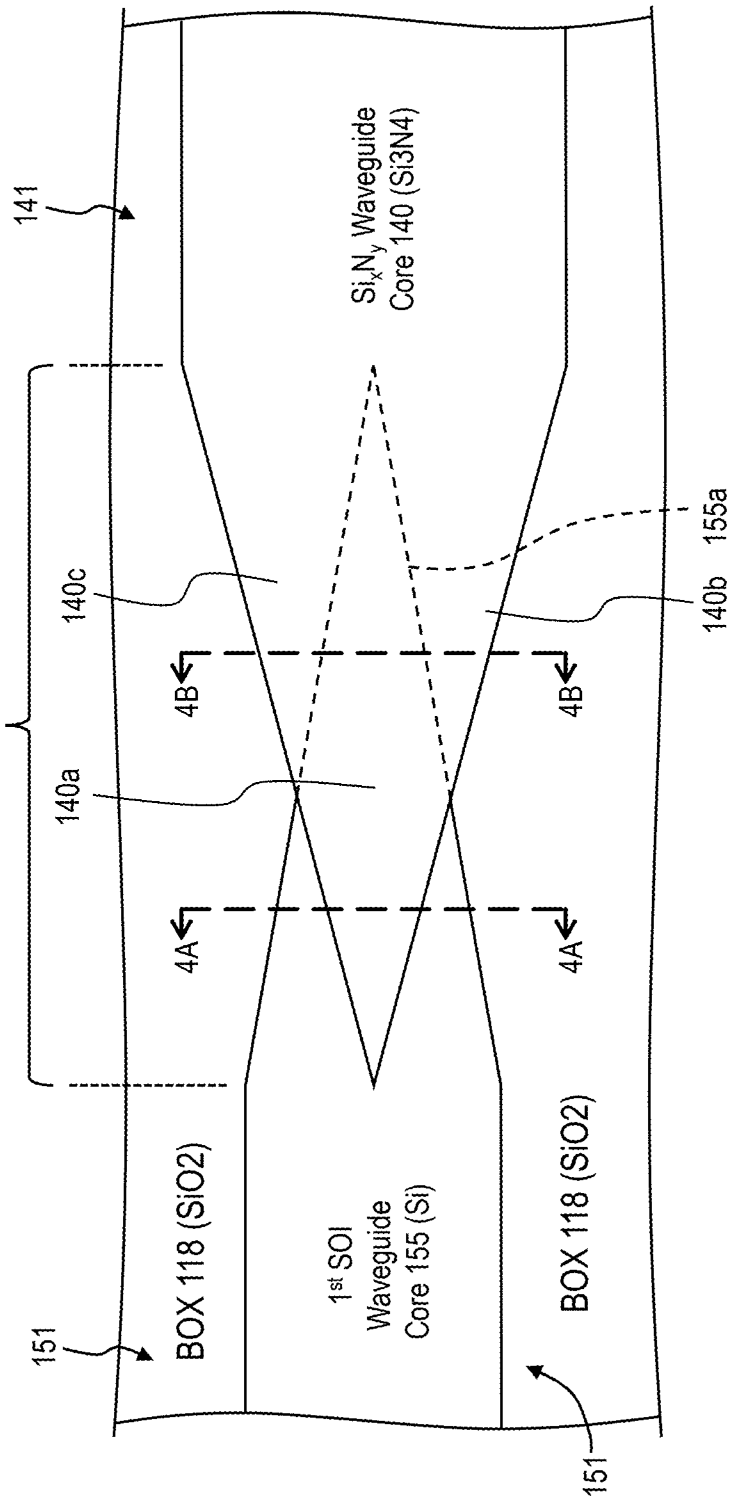
FIG. 3 is a schematic plan view of a portion of another example photonic integrated circuit.
Figure 4A:
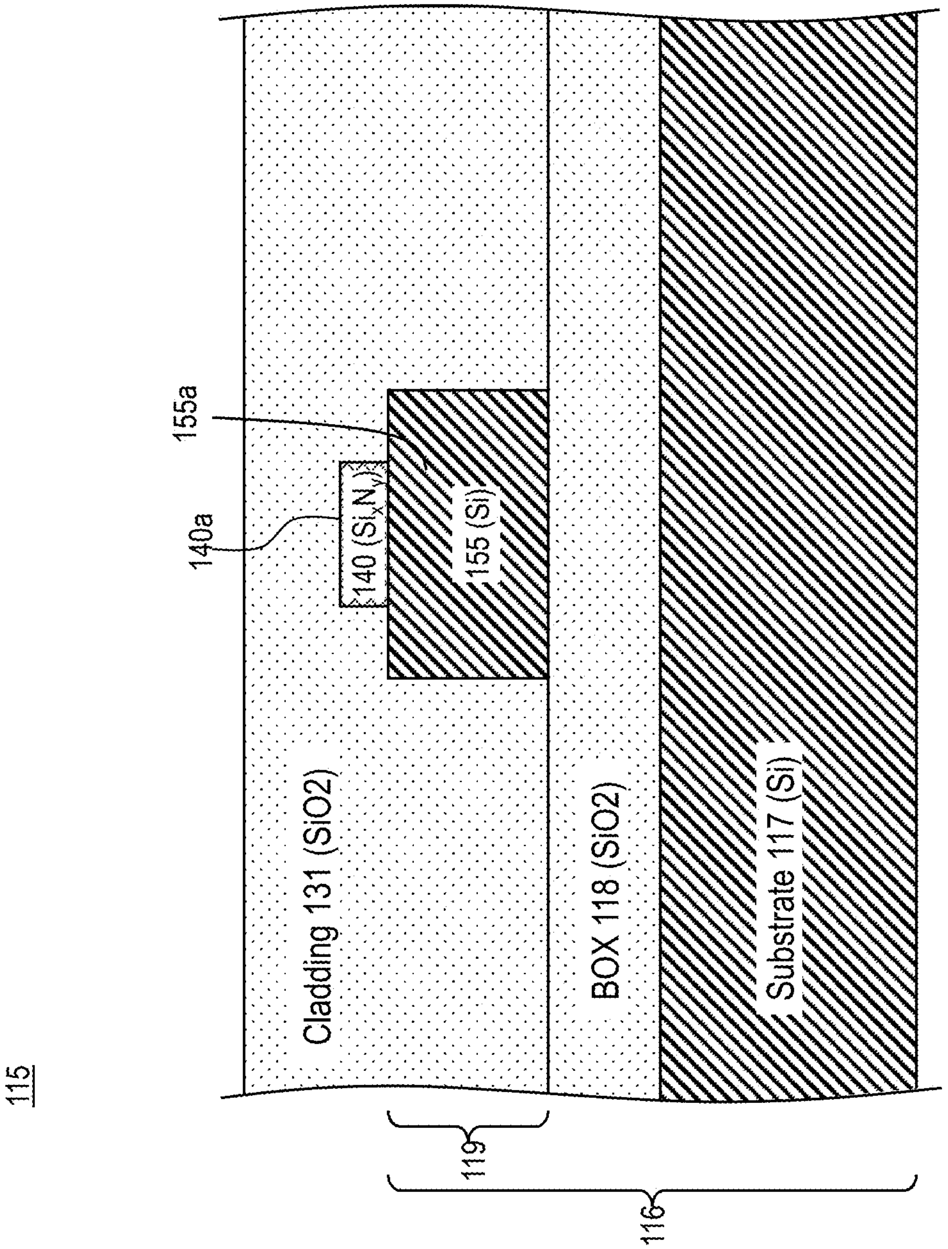
FIG. 4A is a schematic cross-section of the photonic integrated circuit of FIG. 3, with the section taken along 4A-4A in FIG. 3.
Figure 4B:
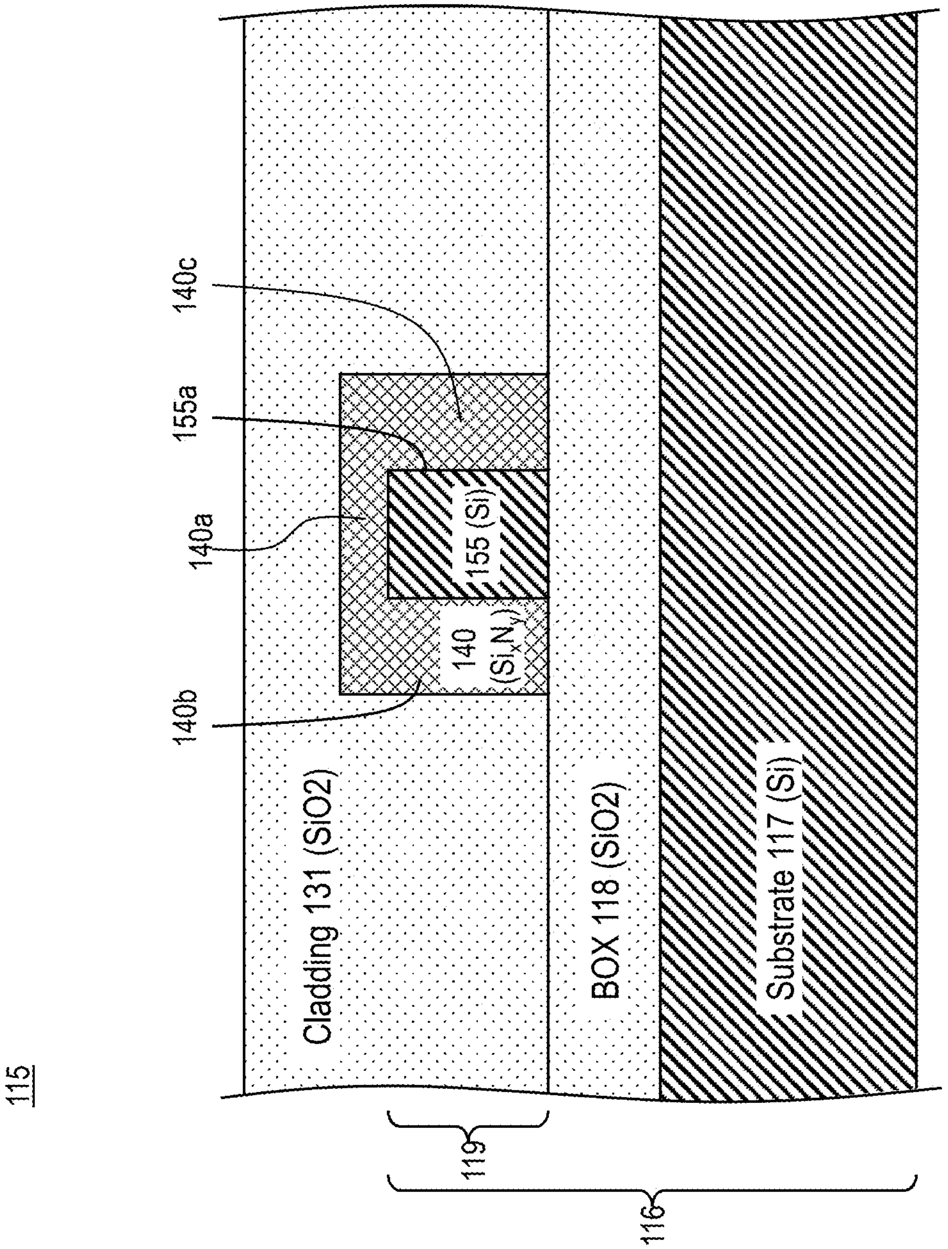
FIG. 4B is a schematic cross-section of the photonic integrated circuit of FIG. 3, with the section taken along 4B-4B in FIG. 3.
Figure 5:
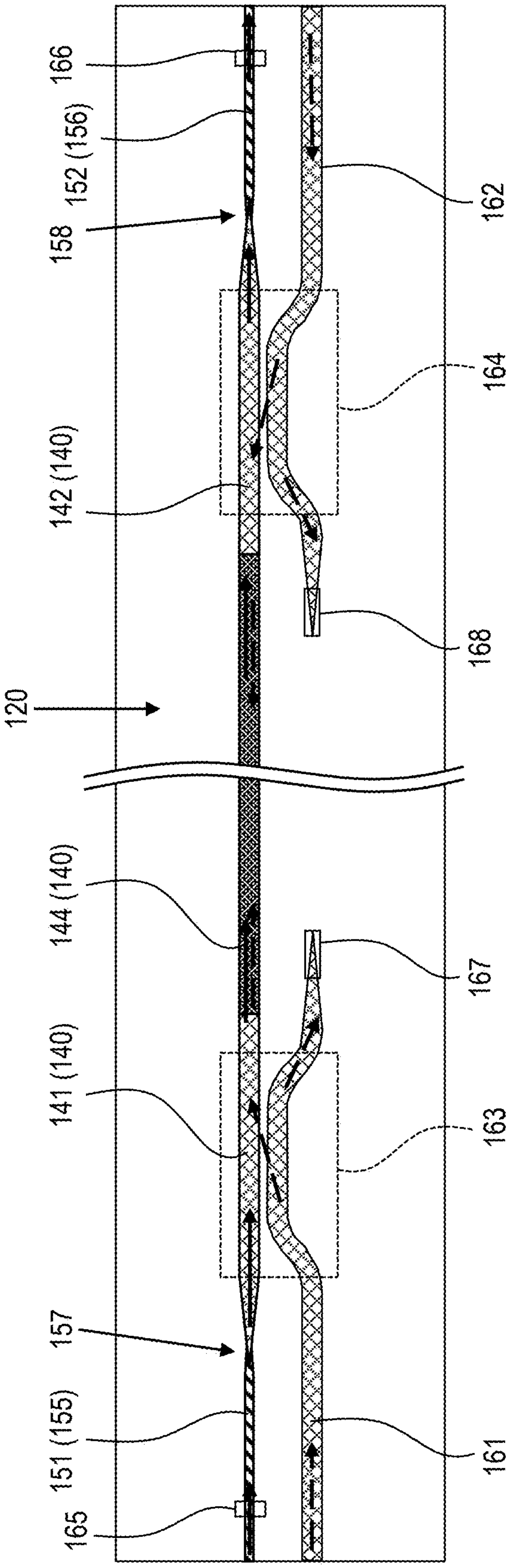
FIG. 5 is a schematic plan view of the photonic integrated circuit of FIG. 3.

Turning now to FIGS. 3-5, an example SOI PIC 115 will be described. The SOI PIC 115 is one example implementation of the SOI PIC 15 described above in which the silicon and silicon/nitrogen waveguide cores overlap both horizontally and vertically. Accordingly, some components of the SOI PIC 115 correspond to (e.g., are the same as, or example implementations of) components of the SOI PIC 15, and these corresponding components are given similar reference numbers herein which have the same last two digits, such as 41 and 141. Aspects of components of the SOI PIC 115 which are already described above in relation to the corresponding components of the SOI PIC 15 are not described below to avoid duplicative description. Although SOI PIC 115 is one example of SOI PIC 15, SOI PIC 15 is not limited to SOI PIC 115.

FIG. 3 illustrates a portion of SOI PIC 115 from a top-down perspective. FIGS. 4A and 4B illustrate cross-sections taken along 4A-4A and 4B-4B, respectively, in FIG. 3. FIG. 5 illustrates the SOI PIC 115 from a top-down perspective. FIGS. 3-5 are schematic in nature, and are not intended to depict dimensions accurately or to scale.

As shown in FIGS. 3-4B, SOI PIC 115 comprises a substrate 117, BOX layer 118, silicon device layer 119, and cladding 131 (cladding 131 is transparent in FIG. 3 to reveal underlying structures). Moreover, as shown in FIG. 5, the SOI PIC 115 comprises a first SOI waveguide 151 ("first silicon waveguide 151") and a silicon/nitrogen waveguide optical amplifier 120, with a first end of the amplifier 120 being optically coupled to the first SOI waveguide 151 via a first transition region 157. Furthermore, in some examples, the SOI PIC 115 also comprises a second SOI waveguide 152 optically coupled to a second end of the silicon/nitrogen waveguide optical amplifier 120 via a second transition region 158, as shown in FIG. 5. These components will be described in greater detail in turn below.

As shown in FIGS. 3-4B, the first SOI waveguide 151 comprises a first SOI waveguide core 155, which is an implementation example of first SOI waveguide core 55 described above. In this implementation, the end portion of first SOI waveguide core 155 in the transition region 157 is tapered to a point, as shown in FIG. 3. As shown in FIG. 5, in some examples in which the SOI PIC 115 comprises a second SOI waveguide 152 ("silicon waveguide 152"), a second SOI waveguide core 156 thereof may also have a tapered shape in the transition region 158 in a similar fashion as the waveguide core 155 (although tapered in an opposite direction, in some examples).

Furthermore, the amplifier 120 is formed, in part, from a first silicon/nitrogen waveguide core 140, which is an implementation example of first silicon/nitrogen waveguide core 40 described above. In this implementation, a first end portion of first silicon/nitrogen waveguide core 140 in the transition region 157 is tapered to a point, as shown in FIG. 3. Silicon/nitrogen waveguide core 140 tapers in an opposite direction than first SOI waveguide core 155, as shown in FIG. 3. Similarly, in some examples in which the SOI PIC 115 also comprises a second SOI waveguide core 146, a second end portion of the second silicon/nitrogen waveguide core 140 may have a tapered shape in the transition region 158, as shown in FIG. 5.

Because the overlapping portions of the cores 140 and 155 taper in opposite directions, the nature of the overlap between the cores 140 and 155 varies across the transition region 157. For example, in some places the core 140 vertically overlaps the core 155, while in other places the core 140 both vertically and horizontally overlaps the core 155. Specifically, as shown in FIG. 4A, in a region near the tapered tip, the portion 140*a* of the silicon/nitrogen waveguide core 140 is positioned above and vertically overlaps an overlapped portion 155*a* of the SOI waveguide core 155, and there is no horizontal overlap. However, slightly farther from the end of the core 140, the core 140 begins to horizontally overlap the core 155 (in addition to vertically overlapping it). Specifically, as shown in FIG. 4B, the portion 140*a* is still positioned above (vertically overlapping) the overlapped portion 155*a* of the SOI waveguide core 155, another portion 140*b* of the silicon/nitrogen waveguide core 140 is positioned laterally adjacent to (horizontally overlapping) one side of the overlapped portion 155*a* of the SOI waveguide core 155, and yet another portion 140*c* of the silicon/nitrogen waveguide core 140 is positioned laterally adjacent to (horizontally overlapping) an opposite side of the overlapped portion 155*a* of the SOI waveguide core 155. Furthermore, the shape of the vertical region of overlap changes across the transition region 157. For example, moving left to right in FIG. 3, the width of the region of vertical overlap between portion 140*a* and portion 155*a* gradually increases from zero until reaching a maximum and then gradually decreases back to zero, e.g., giving the region of vertical overlap a diamond (rhombus) shape. As another example, starting at the point where portions 140*c* and 140*b* begin to horizontal overlap portion 155*a* and moving left to right in FIG. 3, the widths of the portions 140*b* and 140*c* gradually increase while the width of the overlapped portion 155*a* gradually decreases.

The tapered shapes of cores 140 and 155 in the transition region 157 may produce an adiabatic coupling between the cores 140 and 155. This allows for the light mode of the SOI waveguide 151 to adiabatically evolve into the light mode of the silicon/nitrogen waveguide of amplifier 120. These modes are different due to the different materials which make up the respective waveguides. Put differently, the adiabatic coupling allows the mode of the signal light to spread out from a relatively more compact form in the silicon waveguide 151 to a wider form in the silicon/nitrogen optical amplifier 120. It should be noted that the drawings in the figures are for illustrative purposes only. The actual adiabatic coupling regions may have a different shape that that shown in the figures.

As noted above, SOI PIC 115 comprises a silicon/nitrogen waveguide optical amplifier 120, which is one implementation example of amplifier 20 described above. As shown in FIG. 5, amplifier 120 comprises a first undoped waveguide portion 141, a doped waveguide portion 144, and a second undoped waveguide portion 142. In some examples, these waveguide portions 141, 144, and 142 are all formed from the same unitary silicon/nitrogen waveguide core 140, which has been doped or not doped depending on the region. In other examples, the waveguide portions 141, 144, and 142 may be formed from physically separate waveguide cores which are optically coupled together. The doped waveguide portion 144 forms the gain medium of the amplifier 120. The undoped portions 141 and 142 each form one half of a WDM coupler 163 or 164, respectively. These undoped portions 141 and 142 are optically coupled with silicon waveguides 151 and 152, respectively. Signal light carried by the silicon waveguide 151 is coupled over into the first undoped waveguide portion 141 via the transition 157 (the path of signal light is depicted in FIG. 5 by solid-lined arrows). From the first undoped waveguide portion 141, the signal light passes into the doped waveguide portion 144 where it is amplified, and then the amplified light enters the second undoped waveguide portion 142. The amplified signal light is then coupled over from the second undoped waveguide portion 142 into the second SOI waveguide 152 via adiabatic transition 158. The signal light may then be conveyed to some other photonic component for further processing and/or for transition out of the SOI PIC 115. In other examples, the second SOI waveguide 152 and adiabatic transition 158 may be omitted and the light may be conveyed from second undoped waveguide portion 142 to some other component or out of the SOI PIC 115.

As noted above, one half of each WDM coupler 163 or 164 is formed by undoped waveguide portions 141 or 142, respectively. The other half of each WDM coupler 163 or 164 is formed by a pump waveguide 161 or pump waveguide 162, respectively. Each pump waveguide 161 and 162 may comprise a waveguide core (e.g., similar to core 140) at least partially surrounded by cladding, in a similar as waveguide portion 141. These pump waveguides 161 and 162 may be optically coupled to pump laser light sources (not illustrated) which supply pump laser light thereto. The WDM couplers 163 and 164 may couple this pump laser light over into the waveguide portions 141 and 142, which convey the pump light into the doped waveguide portion 144. In FIG. 5, the pump laser light is indicated by dash-lined arrows. An upstream pump laser (not illustrated) supplies pump laser light flowing in a downstream direction (rightward in FIG. 5) to pump waveguide 161, and most of this light is coupled over via the WDM coupler 163 and flows downstream through the doped waveguide portion 144. This pump laser light is progressively absorbed as it traverses the doped waveguide portion 144, and therefore a downstream side of the doped waveguide portion 144 may receive less pump laser light (or none at all) and thus may be excited less than an upstream side. Accordingly, to provide greater and/or more uniform excitement of the doped waveguide portion 144 (and thus higher gain for amplifier 120), a second pump laser light source may be positioned downstream of the amplifier 120 and may supply pump laser light flowing in an upstream direction (leftward in FIG. 5) to pump waveguide 162. Most of this light is coupled over by WDM coupler 164 into undoped portion 142 and flows upstream through doped portion 144. By pumping the waveguide portion 144 from both ends, it can be ensured that both ends receive a desired intensity of pump laser light. A small portion of the pump laser light passing through the WDM couplers 163 and 164 might not coupler over to waveguide portion 141 or 142, and may instead continue to a terminal end of the pump waveguide 161 or 162. In addition, the WDM couplers 163 and 164 may couple pump laser light that was not consumed by the optical amplifier out of the optical amplifier.

In some examples, SOI PIC 115 may comprise photodetectors (e.g., photodiodes) 165, 166, 167, and/or 168. These photodetectors 165, 166, 167, and 168 may be positioned adjacent various waveguide portions of SOI PIC 115 to detect amounts of light flowing through those portions. The photodetectors 165, 166, 167, and 168 may output electrical signals (not illustrated) whose magnitudes depend on the amounts of light passing through the various waveguides. Thus, the electrical signals output by photodetectors 165, 166, 167, and 168 may be provided as feedback to control logic (e.g., a microcontroller) to control operation of the amplifier 120 and/or to detect and/or diagnose problems.

For example, photodetector 165 may be disposed adjacent SOI waveguide core 155 to detect an amount of signal light carried thereby. Similarly, the photodetector 166 may be disposed adjacent second SOI waveguide core 156 to detect an amount of signal light carried thereby. The electrical signals output by these two photodetectors 165 and 166 may thus be indicative of the intensity of signal light at their respective locations. These signals may thus be compared (e.g., by an external controller) to one another to determine how much gain the amplifier 120 is producing. This information may be used as feedback to control the gain of the amplifier 120. For example, if a gain is less than desired, pump laser strength may be increased to produce more gain, or if gain is greater than desired, pump laser strength may be decreased to reduce gain. In some examples, photodetector 165 and 166 may be Germanium (Ge) photodetectors, which comprise a region of Ge material adjacent to the silicon cores 155 or 156. Some of the light carried by the cores 155 or 156 is coupled over to the Ge material. This light causes electrical current to be generated through light absorption, and this electrical current may flow out of photodetectors 165 or 166 via electrical conductors (not illustrated) which are connected to the Ge material region. The magnitude of this electrical current is related to the amount of light flowing through the photodetector 165 or 166. Although only a small portion of the signal light is tapped by the photodetector 165 or 166, this portion may be proportional to the overall amount of light flowing through the cores 155 or 156, and thus the strength of the signal light can be deduced from the output of the photodetector 165 or 166. In some examples, Ge is used for the photodetectors 165 and 166 because it is well suited to absorbing the signal light, which is in the O or C bands in various implementations.

Furthermore, photodetector 167 may be disposed adjacent the terminal end of pump waveguide 161 to detect an amount of pump light which is not coupled over to the waveguide portion 141. Similarly, photodetector 168 may be disposed adjacent the terminal end of pump waveguide 162 to detect an amount of pump light which is not coupled over to the waveguide portion 142. Although only a small proportion of the pump light is not coupled over to the waveguide portions 141 or 142, the amount of pump light which is not coupled over may be correlated to the overall strength of the pump light, and therefore the strength of the pump light may be deduced from the outputs of the photodetector 167 and 168. This information may be used as feedback to control the pump lasers. In some examples, photodetector 167 and 168 may be silicon (Si) photodetectors, which are similar to the Ge photodetectors described above except that silicon is used instead of Ge. Silicon may be used for photodetector 167 and 168 because it may be well suited for absorbing light of the wavelength of the pump laser. However, other materials, such as Ge, could be used instead of silicon.

In some examples, the SOI PIC 115 is formed by providing an SOI wafer 116, forming silicon photonic components including the silicon waveguide 251 in the silicon device layer 119 of the SOI wafer 116, removing some of the silicon in silicon device layer 119 including in a first region, and then forming silicon/nitrogen waveguide core 140 in the first region so that silicon/nitrogen waveguide core 140 is at least partially disposed in a same vertical layer as silicon waveguide core 155. Silicon/nitrogen waveguide core 140 may be formed by deposition using PECVD, ICP-CVD, LPCVD, ALD, sputtering, or other deposition techniques, as discussed above.

Figure 6:
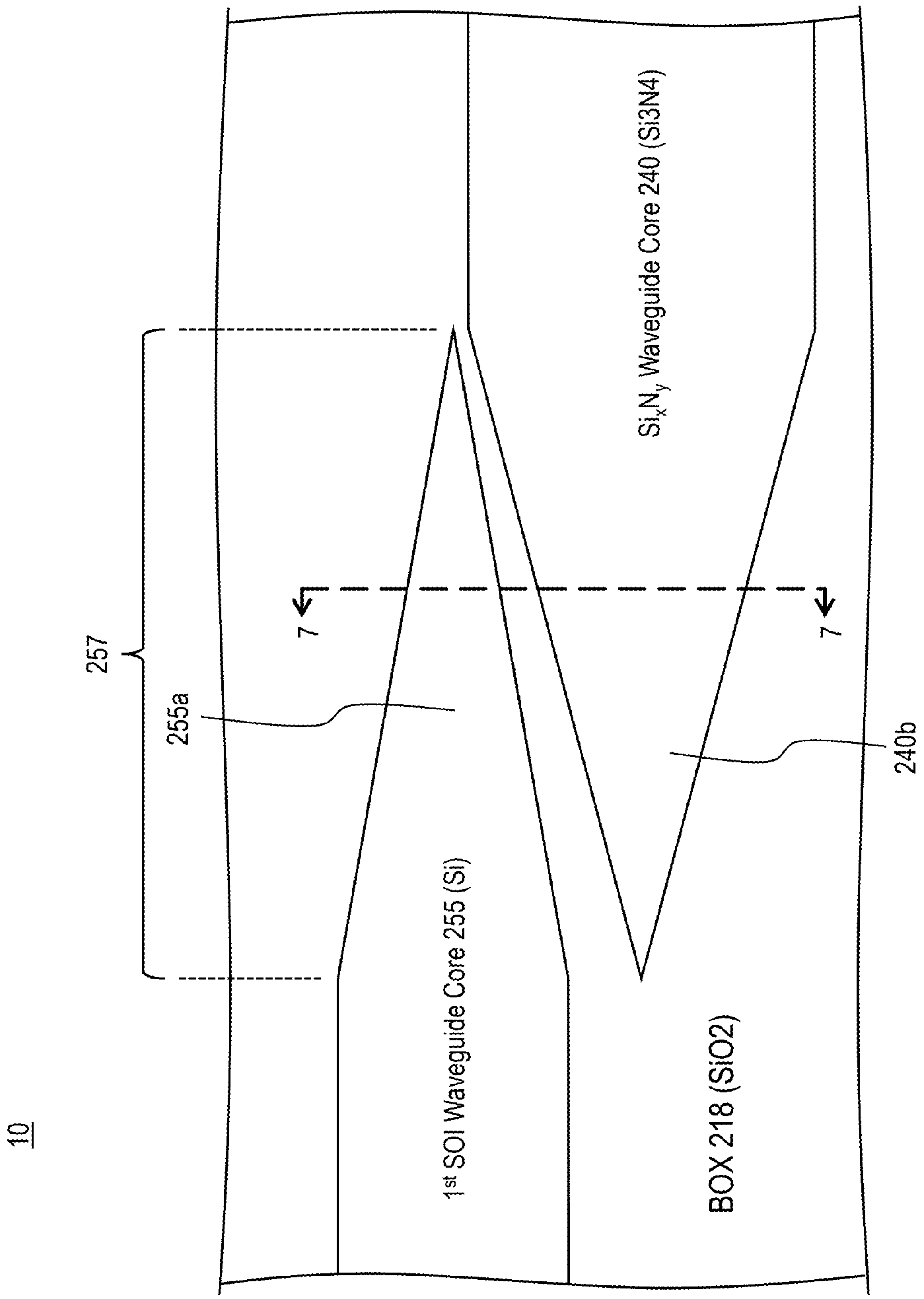
FIG. 6 is a schematic plan view of a portion of another example photonic integrated circuit.
Figure 7:
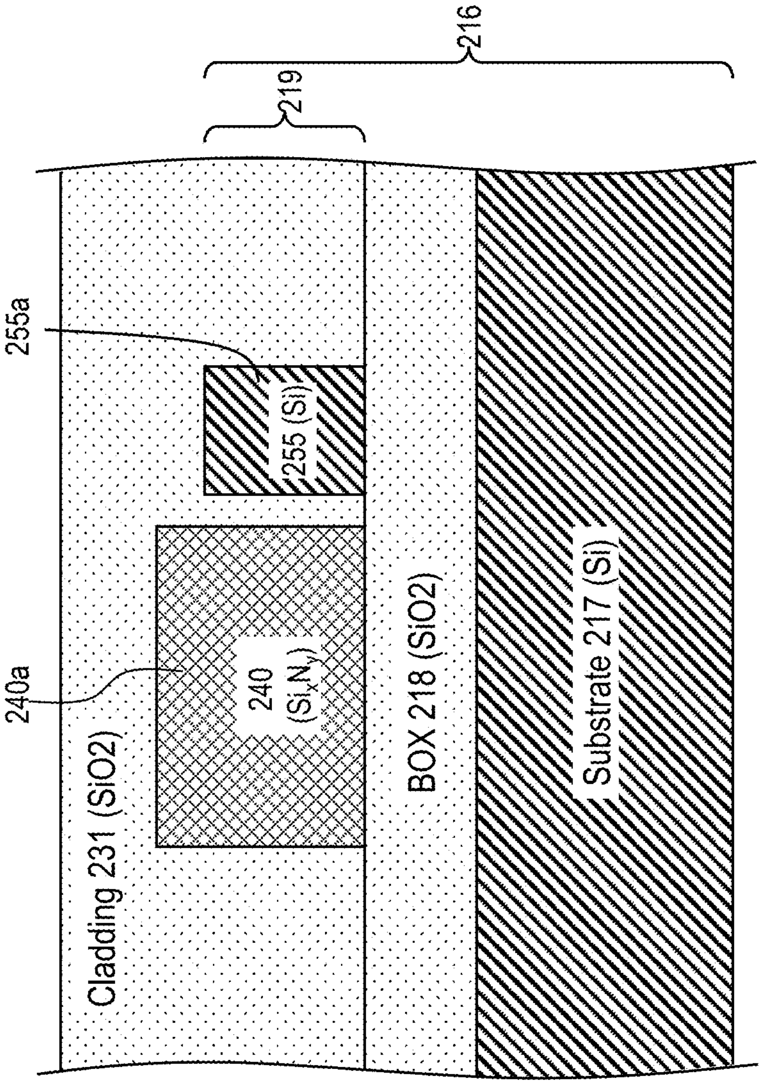
FIG. 7 is a schematic cross-section of the photonic integrated circuit of FIG. 6, with the section taken along 7-7 in FIG. 3.
Figure 8:
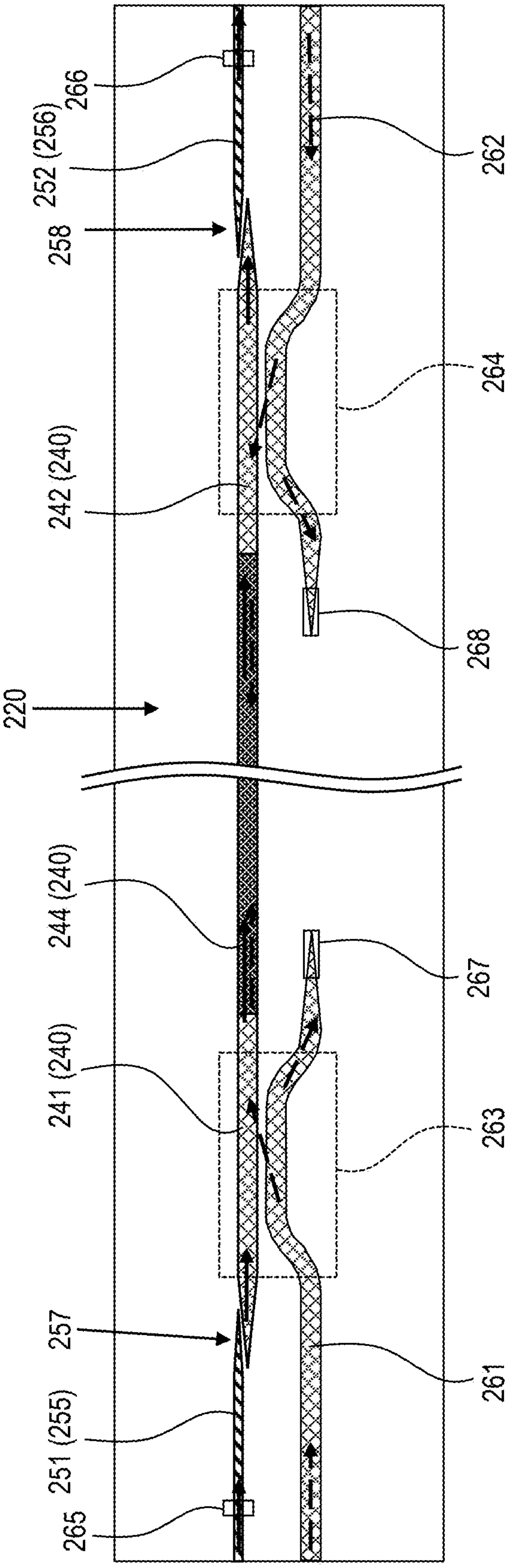
FIG. 8 is a schematic plan view of the photonic integrated circuit of FIG. 6.

Turning now to FIGS. 6-8, an example SOI PIC 215 will be described. The SOI PIC 215 is one example implementation of the SOI PIC 15 described above in which the silicon and silicon/nitrogen waveguide cores overlap horizontally. Accordingly, some components of the SOI PIC 215 correspond to (e.g., are the same as, or example implementations of) components of the SOI PIC 15, and these corresponding components are given similar reference numbers herein which have the same last two digits, such as 41 and 241. Aspects of components of the SOI PIC 215 which are already described above in relation to the corresponding components of the SOI PIC 15 are not described below to avoid duplicative description. Although SOI PIC 215 is one example of SOI PIC 15, SOI PIC 15 is not limited to SOI PIC 215.

FIG. 6 illustrates a portion of SOI PIC 215 from a top-down perspective. FIG. 7 illustrate a cross-section of SO PIC 215 taken along 7-7 in FIG. 6. FIG. 8 illustrates the SOI PIC 215 from a top-down perspective. FIGS. 6-8 are schematic in nature, and are not intended to depict dimensions accurately or to scale.

As shown in FIGS. 6 and 8, SOI PIC 215 comprises a substrate 217, BOX layer 218, silicon device layer 219, and cladding 231 (cladding 231 is transparent in FIG. 6 to reveal underlying structures). Moreover, as shown in FIGS. 6-8, the SOI PIC 215 comprises a first SOI waveguide 251 and a silicon/nitrogen waveguide optical amplifier 220, with a first end of the amplifier 220 being optically coupled to the first SOI waveguide 251 via a first transition region 257. Furthermore, in some examples, the SOI PIC 215 also comprises a second SOI waveguide 252 optically coupled to a second end of the silicon/nitrogen waveguide optical amplifier 220 via a second transition region 258, as shown in FIG. 8.

As shown in FIGS. 6-8, the first SOI waveguide 251 comprises a first SOI waveguide core 255 and the silicon/nitrogen waveguide optical amplifier 220 comprises first silicon/nitrogen waveguide portion 241 ("undoped silicon/nitrogen waveguide portion 241") comprising silicon/nitrogen waveguide core 240. Like the implementation of FIGS. 3-5, in this implementation, the end portions of these waveguide cores 255 and 240 are tapered, as shown in FIG. 6. However, unlike the implementation of FIGS. 3-5, in this implementation the tapered ends of the waveguide cores 255 and 240 do not vertically overlap one another. Instead, as shown in FIG. 7, the cores 255 and 240 are disposed in the same vertical layer as one another but are offset from one another horizontally. Thus, as shown in FIGS. 6 and 7, a portion 240*b* of waveguide core 240 horizontally overlaps a portion 255*a* of waveguide core 255. In some examples, the cores 255 and 240 do not touch one another, as shown in FIGS. 6 and 7. In other examples, the cores 255 and 240 may touch one another. The tapered shapes of cores 240 and 255 in the transition region 257 may produce an adiabatic coupling between the cores 240 and 255. The figures are for illustrative purpose only. The shape of the adiabatic coupler may be symmetric, as illustrated, or asymmetric.

As shown in FIG. 8, in some examples in which the SOI PIC 215 comprises a second SOI waveguide 252, a second SOI waveguide core 256 thereof may have a tapered end, and the amplifier 220 may comprise a second silicon/nitrogen waveguide portion 242 ("undoped silicon/nitrogen waveguide portion 242") which also has a silicon/nitrogen waveguide core 240 with a tapered end portion, with the two end portions overlapping in the transition region 258.

As noted above, SOI PIC 215 comprises a silicon/nitrogen waveguide optical amplifier 220, which is one implementation example of amplifier 20 described above. As shown in FIG. 8, amplifier 220 comprises a first undoped waveguide portion 241, a doped waveguide portion 244, and a second undoped waveguide portion 242. In some examples, these waveguide portions 241, 244, and 242 may all be formed from the same unitary silicon/nitrogen waveguide core 240, which has been doped or not doped depending on the region. In other examples, the waveguide portions 241, 244, and 242 may be formed by separate waveguide cores which are optically coupled together. The optical amplifier 220 comprises WDM couplers 263 or 264, which are formed by undoped waveguide portions 241 or 242, respectively, and by pump waveguides 261 or 262, respectively. Each pump waveguide 261 and 262 may be optically coupled to pump laser light sources (not illustrated) which supply pump laser light thereto, and the WDM couplers 263 and 264 may couple this pump laser light over into the waveguide portions 241 and 242, which convey the pump light into the doped waveguide portion 244.

In some examples, SOI PIC 215 may comprise photodetectors (e.g., photodiodes) 265, 266, 267, and/or 268. These photodetectors 265, 266, 267, and 268 may be positioned adjacent various waveguide portions of SOI PIC 215 to detect amounts of light flowing through those portions. The photodetectors 265, 266, 267, and 268 may be configured similarly to photodetectors 165, 166, 167, and 168 described above.

In some examples, the SOI PIC 215 is formed by providing an SOI wafer 216, forming silicon photonic components including the silicon waveguide 251 in the silicon device layer 219 of the SOI wafer 216, removing some of the silicon in silicon device layer 219 including in a first region, and then forming silicon/nitrogen waveguide core 240 in the first region so that silicon/nitrogen waveguide core 240 is at least partially disposed in a same vertical layer as core 255. Silicon/nitrogen waveguide core 240 may be formed by deposited using PECVD, ICP-CVD, LPCVD, ALD, sputtering, or other deposition techniques, as discussed above.

Turning now to FIGS. 9-12, an example SOI PIC 315 will be described. The SOI PIC 315 is one example implementation of the SOI PIC 15 described above in which the silicon and silicon/nitrogen waveguide cores overlap vertically. Accordingly, some components of the SOI PIC 315 correspond to (e.g., are the same as, or example implementations of) components of the SOI PIC 15, and these corresponding components are given similar reference numbers herein which have the same last two digits, such as 41 and 341. Aspects of components of the SOI PIC 315 which are already described above in relation to the corresponding components of the SOI PIC 15 are not described below to avoid duplicative description. Although SOI PIC 315 is one example of SOI PIC 15, SOI PIC 15 is not limited to SOI PIC 315.

Figure 9:
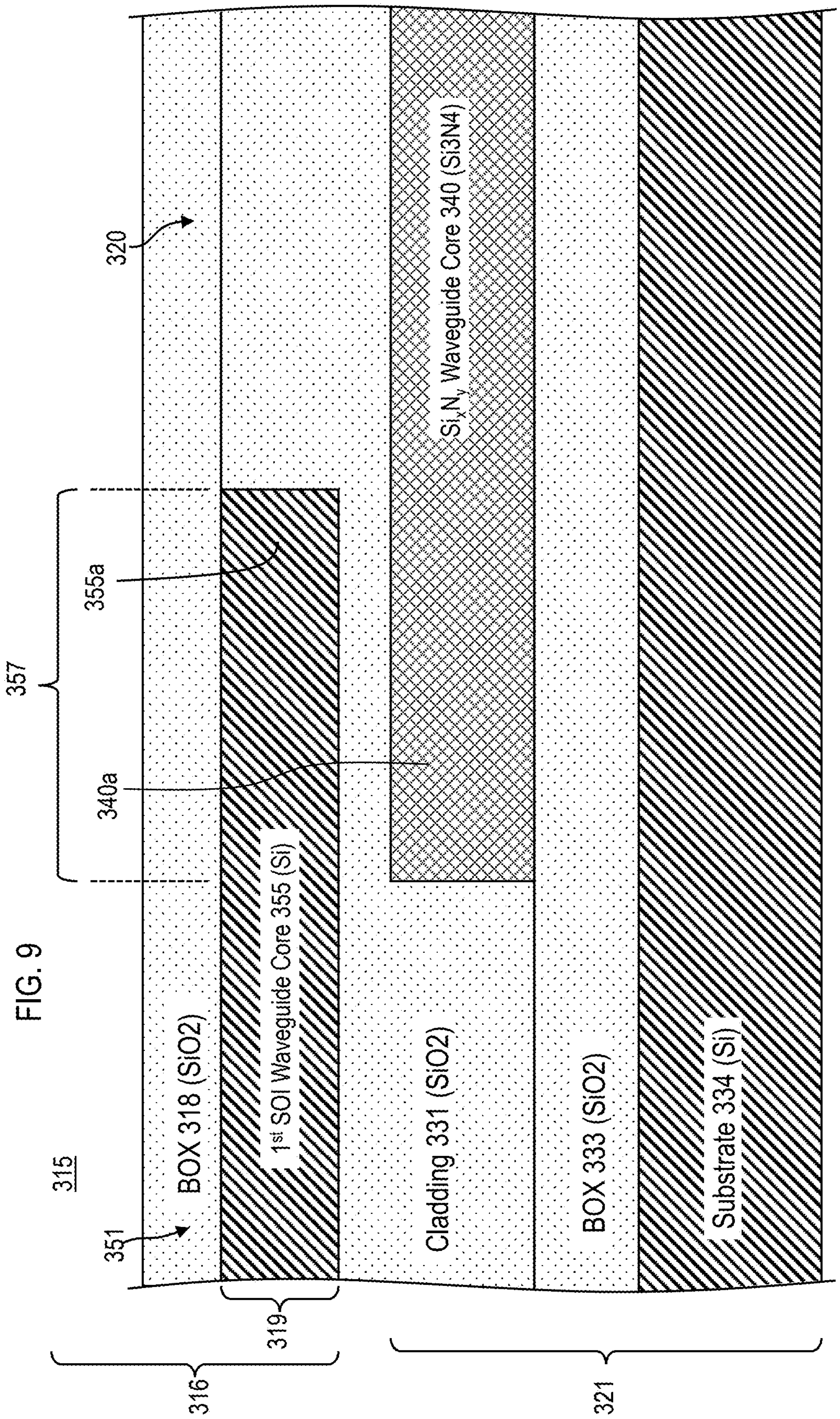
FIG. 9 is a schematic cross-section of another example photonic integrated circuit, with the section taken along 9-9 in FIG. 10.
Figure 10:
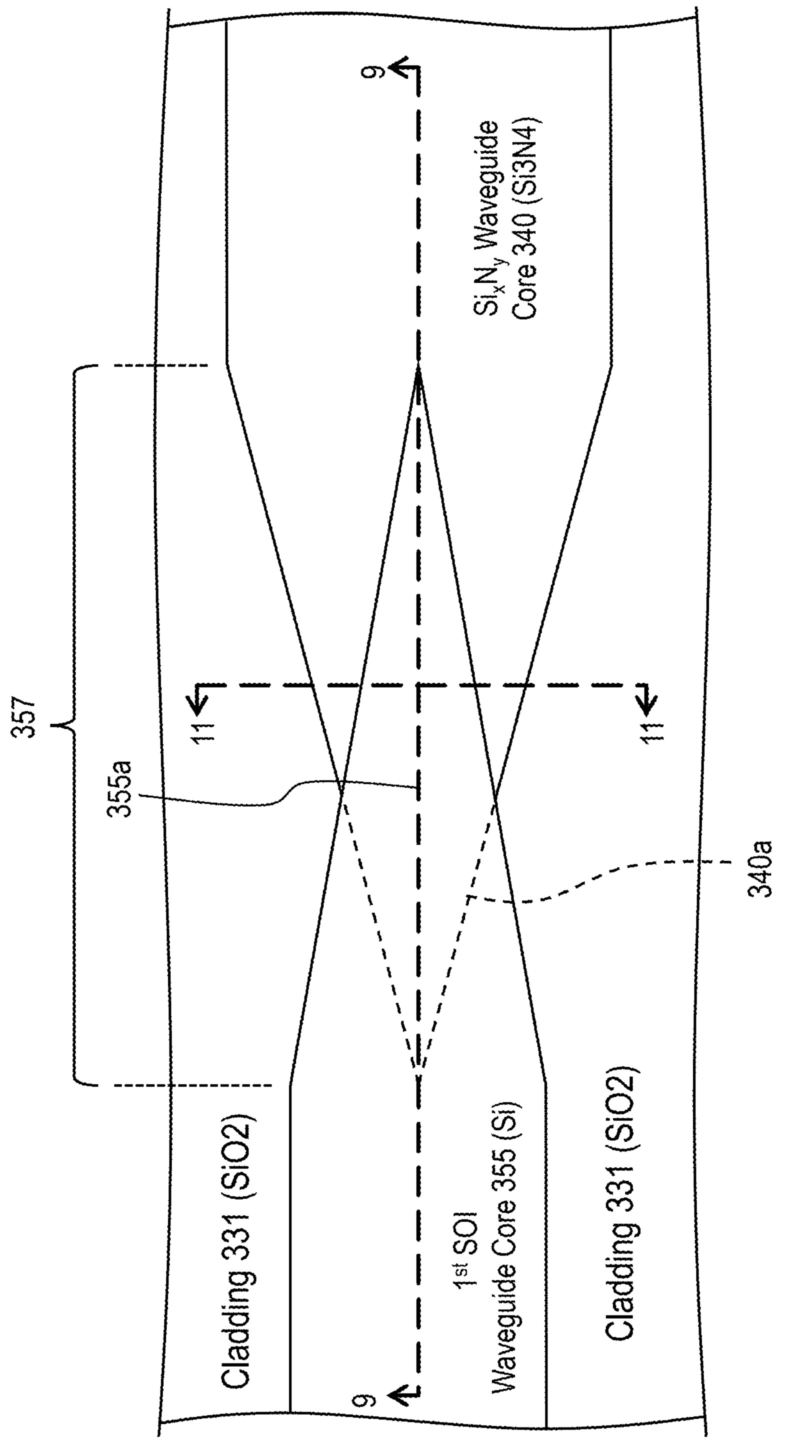
FIG. 10 is a schematic plan view of the photonic integrated circuit of FIG. 9.
Figure 11:
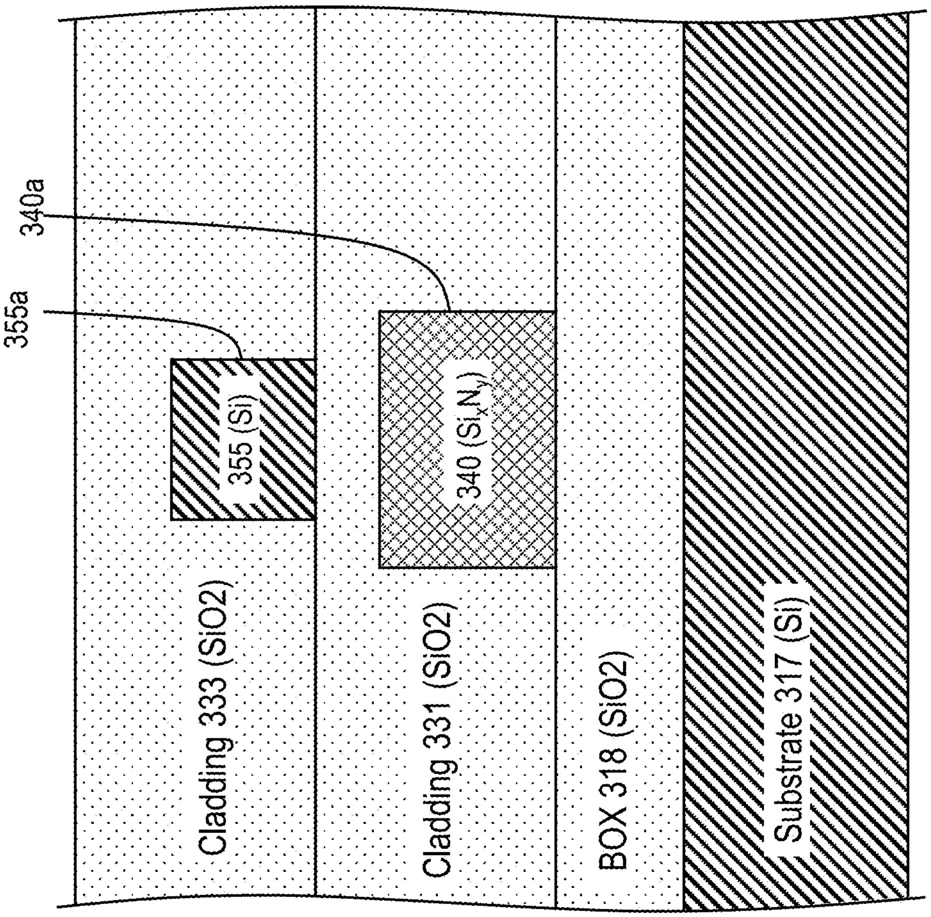
FIG. 11 is a schematic cross-section of the photonic integrated circuit of FIG. 9, with the section taken along 11-11 in FIG. 10.
Figure 12:
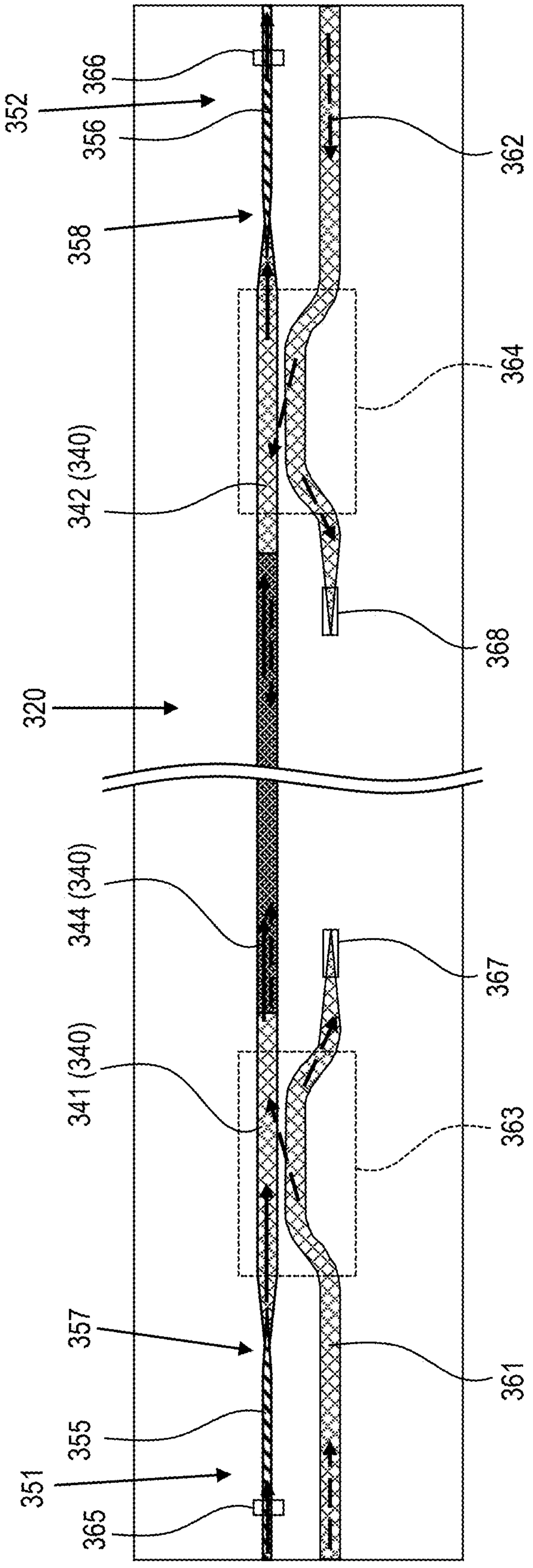
FIG. 12 is a schematic plan view of the photonic integrated circuit of FIG. 9.

FIG. 9 illustrate a cross-section of SOI PIC 315 taken along 9-9 in FIG. 10. FIG. 10 illustrates SOI PIC 315 from a top-down perspective. FIG. 11 illustrates SOI PIC 315 in another cross-section taken along 11-11 in FIG. 10. FIG. 12 illustrates the SOI PIC 315 from a top-down perspective. FIGS. 9-12 are schematic in nature, and are not intended to depict dimensions accurately or to scale.

As shown in FIGS. 9-11, SOI PIC 315 comprises a substrate 334, first BOX layer 318, silicon device layer 319, and cladding 331, and a second BOX layer 333. Moreover, as shown in FIGS. 9-12, the SOI PIC 315 comprises a first SOI waveguide 351 and a silicon/nitrogen waveguide optical amplifier 320, with a first end of the amplifier 320 being optically coupled to the first SOI waveguide 351 via a first transition region 357. Furthermore, is some examples, the SOI PIC 315 also comprises a second SOI waveguide 352 optically coupled to a second end of the silicon/nitrogen waveguide optical amplifier 320 via a second transition region 358, as shown in FIG. 12.

As shown in FIGS. 9-12, the first SOI waveguide 351 comprises a first SOI waveguide core 355 and the silicon/nitrogen waveguide optical amplifier 320 comprises first silicon/nitrogen waveguide portion 341 comprising waveguide core 340. Like the implementations of FIGS. 3-8, in this implementation, the end portions of these waveguide cores 355 and 340 are tapered, as shown in FIG. 10. However, unlike the implementations of FIGS. 3-8, in this implementation the tapered ends of the waveguide cores 355 and 340 do not horizontally overlap one another. Instead, as shown in FIGS. 9 and 11, the cores 355 and 340 are disposed in wholly different vertical layers as one another but are vertically aligned. Thus, portion **340*a* vertically overlaps portion 355*a*. In some examples, the cores 355 and 340 do not touch one another, as shown in FIGS. 9 and 11 (e.g., a portion of cladding 331 is disposed therebetween). In other examples, the cores 355 and 340 may touch one another. The tapered shapes of cores 340 and 355 in the transition region 357 may produce an adiabatic coupling between the cores 340 and 355. In some examples, the cores 355 and 340** may be vertically aligned and laterally offset.

As shown in FIG. 12, in some examples in which the SOI PIC 315 comprises a second SOI waveguide 352, a second SOI waveguide core 356 thereof may have a tapered end, and the amplifier 320 may comprise a second silicon/nitrogen waveguide portion 342 which also has a tapered end portion, with the two end portions overlapping in the transition region 358.

As noted above, SOI PIC 315 comprises a silicon/nitrogen waveguide optical amplifier 320, which is one implementation example of amplifier 20 described above. As shown in FIG. 12, amplifier 320 comprises a first undoped waveguide portion 341, a doped waveguide portion 344, and a second undoped waveguide portion 342. In some examples, these waveguide portions 341, 344, and 342 may all be formed from the same unitary silicon/nitrogen waveguide core 340, which has been doped or not doped depending on the region. In other examples, the waveguide portions 341, 344, and 342 may be formed by separate waveguide cores which are optically coupled together. The optical amplifier 320 comprises WDM couplers 363 or 364, which are formed by undoped waveguide portions 341 or 342, respectively, and by pump waveguides 361 or 362, respectively. Each pump waveguide 361 and 362 may be optically coupled to pump laser light sources (not illustrated) which supply pump laser light thereto, and the WDM couplers 363 and 364 may couple this pump laser light over into the waveguide portions 341 and 342, which convey the pump light into the doped waveguide portion 344.

In some examples, SOI PIC 315 may comprise photodetectors (e.g., photodiodes) 365, 366, 367, and/or 368. These photodetectors 365, 366, 367, and 368 may be positioned adjacent various waveguide portions of SOI PIC 315 to detect amounts of light flowing through those portions. The photodetectors 365, 366, 367, and 368 may be configured similarly to photodetectors 165, 166, 167, and 168 described above.

In some examples, the SOI PIC 315 is formed by providing an SOI wafer 316 and forming silicon photonic components including the silicon waveguide 351 in the silicon device layer 319 of the SOI wafer 316. The SOI wafer 316 may initially comprise a silicon substrate (handle) similar to substrates 17, 117 or 217, which is not visible in FIG. 9 because it has been removed by later processing steps. Separate from the SOI wafer 316, a silicon/nitrogen wafer 321 is formed. The silicon/nitrogen wafer 321 comprises a substrate 334, a buried oxide (BOX) layer 333, and various silicon/nitrogen photonic components including a silicon/nitrogen waveguide core 340 are formed on the BOX layer 333. The silicon/nitrogen photonic components, including silicon/nitrogen waveguide core 340, may be formed by deposition on the BOX layer 333, by low pressure chemical vapor deposition (LPCVD), plasma enhanced chemical deposition (PECVD), inductively coupled plasma chemical deposition (ICP-CVD), sputtering, etc. Once silicon waveguide 351 and silicon/nitrogen waveguide core 340 have been separately formed on the SOI wafer 316 and the silicon/nitrogen wafer 321, respectively, these wafers 316 and 321 may be bonded together with the first SOI waveguide core 355 vertically overlapping with the silicon/nitrogen waveguide core 340. Although cladding 331 is shown as a single layer for ease of description, in some examples the cladding 331 may be formed from multiple layers, such as a layer which is formed on SOI wafer 316 prior to the wafer bonding and another layer formed on silicon/nitrogen wafer 321 prior to wafer bonding. Subsequent to the wafer bonding, one of the substrates may be removed, for example by grinding or etching. In FIG. 9, the substrate of the SOI wafer 316 has been removed. In other examples, the substrate 334 could be removed instead. The order of bonding the silicon/nitride wafer 321 to the SOI wafer 316, and forming the silicon/nitride and SOI waveguide cores is not limited to that described above. For example, silicon waveguides 351 may be formed on SOI wafer 316 after bonding to silicon/nitrogen wafer 321. Alternatively, silicon/nitride waveguide core 340 may be formed on silicon/nitride wafer 321 after bonding to SOI wafer 316.

Figure 13:
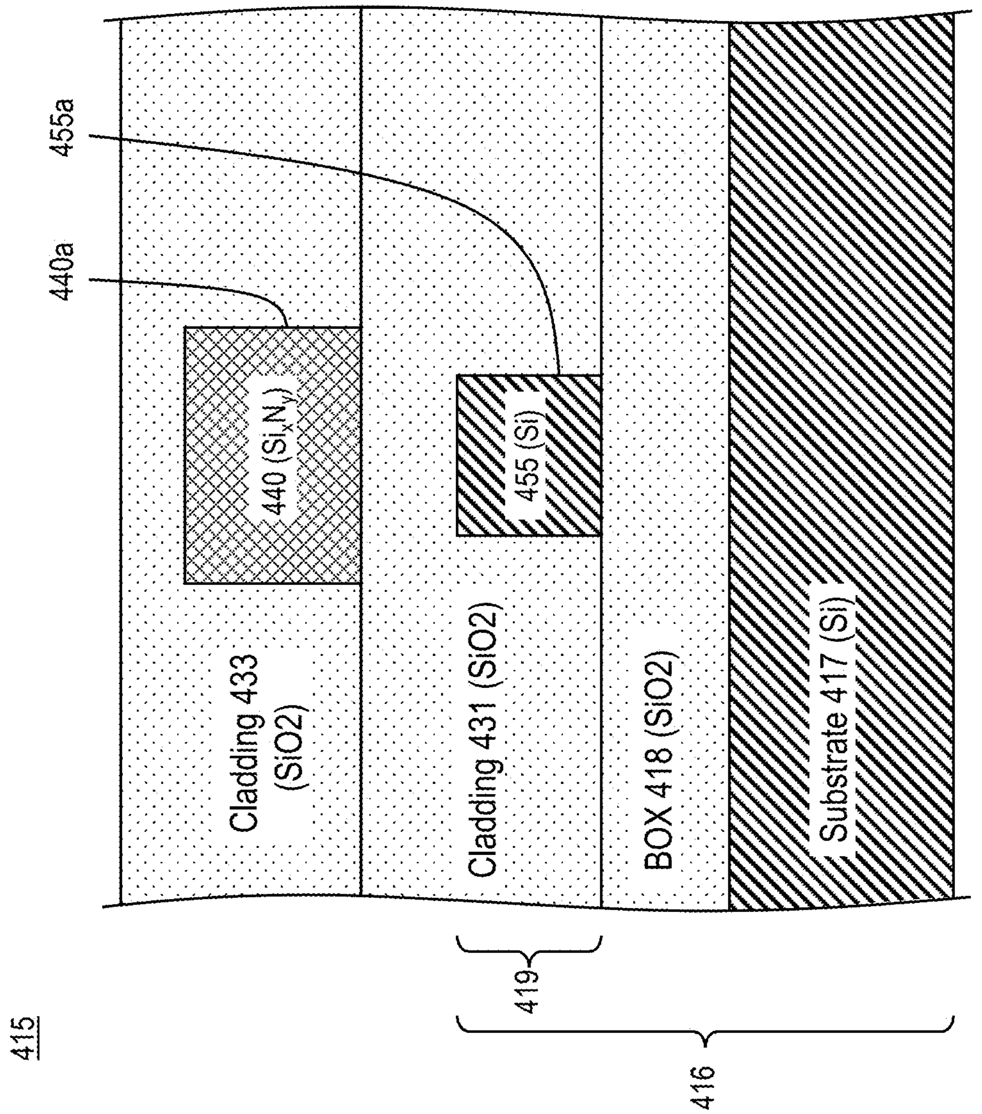
FIG. 13 is a schematic cross-section of another example photonic integrated circuit.

In other examples, instead of forming the silicon components and the silicon/nitrogen components in separate wafers which are later bonded together, the silicon/nitrogen components (including silicon/nitrogen waveguide core) may be formed directly on the same wafer as the silicon components. For example, FIG. 13 illustrates an example SOI PIC 415, which is a variation of the SOI PIC 315. SOI PIC 415 comprises a substrate 417, BOX layer 418, cladding 431, and cladding 433. Moreover, SOI PIC 415 comprises a first SOI waveguide with a silicon waveguide core 455 and a silicon/nitrogen waveguide optical amplifier with a silicon/nitrogen waveguide core 440. The waveguide core 440 is optically coupled to the silicon waveguide core 455. The SOI PIC 415 may include additional components similar to those of SOI PIC 315. The SOI PIC 415 differs from the SOI PIC 315 in that in the SOI PIC 415 the silicon/nitrogen photonic components, including waveguide core 440, are disposed above the silicon components, including silicon waveguide core 455, instead of the other way around. In some examples, the SOI PIC 415 may be formed by first forming silicon photonic components (including silicon waveguide core 455) in the silicon device layer 419 of an SOI wafer 416, depositing silicon/nitrogen material on the silicon device layer 419, and etching or otherwise shaping the silicon/nitrogen material to form the various silicon/nitrogen photonic components. In other examples, the vertical order of the silicon waveguide core 455 and silicon/nitrogen waveguide core 440 may be reversed.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A photonic integrated circuit, comprising:

a silicon substrate;

a buried oxide (BOX) layer disposed on the silicon substrate;

a silicon device layer disposed on the BOX layer;

a first silicon waveguide comprising a first silicon waveguide core formed in the silicon device layer; and a silicon/nitrogen waveguide optical amplifier comprising a first silicon/nitrogen waveguide core portion disposed on the BOX layer and optically coupled with the first silicon waveguide core, wherein first silicon/nitrogen waveguide core portion comprises a compound of silicon and nitrogen.

2. The photonic integrated circuit of claim 1, wherein the first silicon/nitrogen waveguide core portion is optically coupled with the first silicon waveguide core by at least one of:

the first silicon/nitrogen waveguide core portion vertically overlapping with the first silicon waveguide core;

the first silicon/nitrogen waveguide core portion horizontally overlapping with the first silicon waveguide core; and the first silicon/nitrogen waveguide core portion vertically and horizontally overlapping with the first silicon waveguide core.

3. The photonic integrated circuit of claim 2, wherein an end of the first silicon/nitrogen waveguide core portion is tapered in a first direction, and an end of the first silicon waveguide core overlapped by the first silicon/nitrogen waveguide core portion is tapered in a second direction opposite the first direction.

4. The photonic integrated circuit of claim 3, wherein the tapered end of the first silicon/nitrogen waveguide core portion vertically and horizontally overlaps the tapered end of the first silicon waveguide core.

5. The photonic integrated circuit of claim 3, wherein the tapered end of the first silicon/nitrogen waveguide core portion horizontally overlaps the tapered end of the first silicon waveguide core without vertical overlap.

6. The photonic integrated circuit of claim 3, wherein the tapered end of the first silicon/nitrogen waveguide core portion vertically overlaps the tapered end of the first silicon waveguide core without horizontal overlap.

7. The photonic integrated circuit of claim 6, wherein the first silicon waveguide core is disposed on the first silicon/nitrogen waveguide core portion.

8. The photonic integrated circuit of claim 6, wherein the first silicon/nitrogen waveguide core portion is disposed on the first silicon waveguide core.

9. The photonic integrated circuit of claim 3, wherein an overlap between the tapered end of the first silicon/nitrogen waveguide core portion and the tapered end of the first silicon waveguide core forms an adiabatic transition coupling the first silicon waveguide core with the first silicon/nitrogen waveguide core portion.

10. The photonic integrated circuit of claim 1, comprising:

a second silicon waveguide comprising a second silicon waveguide core formed in the silicon device layer, wherein the silicon/nitrogen waveguide optical amplifier comprises:

a second silicon/nitrogen waveguide core portion disposed on the BOX layer and optically coupled with the second silicon waveguide core, the second silicon/nitrogen waveguide core portion comprising the compound of silicon and nitrogen; and a doped silicon/nitrogen waveguide core portion disposed on the BOX layer and optically coupled with the first silicon/nitrogen waveguide core portion and with the second silicon/nitrogen waveguide core portion, the doped silicon/nitrogen waveguide core portion comprising the compound of silicon and nitrogen doped with a rare earth element.

11. The photonic integrated circuit of claim 10, comprising:

wherein the compound of silicon and nitrogen comprises at least one of: silicon nitride ($Si_3N_4$), silicon rich nitride, or silicon oxynitride ($Si_xO_yN_z$).

12. The photonic integrated circuit of claim 10, wherein the silicon/nitrogen waveguide optical amplifier comprises:

a first pump waveguide optically coupled with the first silicon/nitrogen waveguide core portion and configured to supply pump light to the doped silicon/nitrogen waveguide core portion via the first silicon/nitrogen waveguide core portion; and a second pump waveguide optically coupled with the second silicon/nitrogen waveguide core portion and configured to supply pump light to the doped silicon/nitrogen waveguide core portion via the second silicon/nitrogen waveguide core portion.

13. The photonic integrated circuit of claim 12, comprising:

a first photodetector optically coupled with the first pump waveguide;

a second photodetector optically coupled with the second pump waveguide;

a third photodetector optically coupled with the first silicon waveguide core; and a fourth photodetector optically coupled with the second silicon waveguide core.

14. The photonic integrated circuit of claim 13, wherein the first and second photodetectors comprise silicon (Si) photodetectors and the third and fourth photodetectors comprise germanium (Ge) photodetectors.

15. The photonic integrated circuit of claim 10, wherein the doped silicon/nitrogen waveguide core portion and the first and second silicon/nitrogen waveguide core portions are parts of the same unitary silicon/nitrogen waveguide core, with the doped silicon/nitrogen waveguide core portion comprising a doped portion of the silicon/nitrogen waveguide core and the first and second silicon/nitrogen waveguide core portions comprising undoped portions of the silicon/nitrogen waveguide core.

16. The photonic integrated circuit of claim 12, wherein first silicon waveguide core, the second silicon waveguide core, the first silicon/nitrogen waveguide core portion, the second silicon/nitrogen waveguide core portion, the first pump waveguide, and the second pump waveguide are all formed in a first layer; and wherein the doped silicon/nitrogen waveguide core portion is formed in a second layer different from the first layer.

17. A method of forming a photonic integrated circuit, comprising:

providing a silicon-on-insulator (SOI) wafer comprising a silicon substrate, a buried oxide (BOX) layer, and a silicon device layer;

forming a silicon waveguide core in the silicon device layer; and forming a silicon/nitrogen waveguide core on the BOX layer such that the silicon/nitrogen waveguide core is optically coupled with the silicon waveguide core, wherein silicon/nitrogen waveguide core comprises a compound of silicon and nitrogen.

18. The method of claim 17, wherein forming the silicon/nitrogen waveguide core on the BOX layer comprises removing silicon from a first region in the silicon device layer and depositing the compound of silicon and nitrogen in the first region such that the silicon/nitrogen waveguide core at least horizontally overlaps part of the silicon waveguide core.

19. The method of claim 17, comprising:

forming a silicon/nitrogen waveguide optical amplifier by doping a portion of the silicon/nitrogen waveguide core with a rare earth element.

20. A method of forming a photonic integrated circuit, comprising:

providing a silicon-on-insulator (SOI) wafer comprising a first substrate, a buried oxide (BOX) layer, and a silicon device layer;

forming a silicon waveguide core formed in the silicon device layer;

providing a silicon/nitrogen wafer comprising second substrate and a silicon/nitrogen layer, wherein silicon/nitrogen layer comprises a compound of silicon and nitrogen;

forming a silicon/nitrogen waveguide core portion in the silicon/nitrogen layer; and bonding the silicon/nitrogen wafer to the SOI wafer such that the silicon/nitrogen waveguide core overlaps and is optically coupled with the silicon waveguide core.

* * * * *